US006074698A

United States Patent [19]

Sakurai et al.

[11] Patent Number: 6,074,698

[45] Date of Patent: Jun. 13, 2000

[54] PROCESS FOR PRODUCING SURFACE-MODIFIED RUBBER, SURFACE-MODIFIED RUBBER, AND SEALING MATERIAL

[75] Inventors: Shinya Sakurai; Yukio Kobayashi, both of Yao, Japan

[73] Assignee: Nippon Valdua Industries, Ltd., Japan

[21] Appl. No.: 09/142,531

[22] PCT Filed: Dec. 25, 1997

[86] PCT No.: PCT/JP97/04831

§ 371 Date: Sep. 9, 1998

§ 102(e) Date: Sep. 9, 1998

[87] PCT Pub. No.: WO98/30622

PCT Pub. Date: Jul. 16, 1998

[30] Foreign Application Priority Data

Jan. 10, 1997 [JP] Japan .................................... 9-003121
Oct. 8, 1997 [JP] Japan .................................... 9-276257

[51] Int. Cl.[7] ................................ B05D 1/18; B05D 3/02

[52] U.S. Cl. ....................... 427/307; 427/387; 427/393.5; 427/430.1

[58] Field of Search ................................ 427/393.5, 387, 427/430.1, 307

[56] References Cited

U.S. PATENT DOCUMENTS 5,262,237 11/1993 Chen et al. .......................... 427/393.5

FOREIGN PATENT DOCUMENTS 53-57281 5/1978 Japan .
4-103641 4/1992 Japan .
7-103258 11/1995 Japan .

OTHER PUBLICATIONS

Patent Abstracts of Japan, Publication No. JP–53 003495 A, Jan. 13, 1978.

Patent Abstracts of Japan, Publication No. JP–1 301725 A, Dec. 05, 1989.

Patent Abstracts of Japan, Publication No. JP–4 202239 A, Jul. 23, 1992.

Patent Abstracts of Japan, Publication No. JP–6 53823 (JP–62 146932), Jun. 30, 1987.

*Primary Examiner*—Erma Cameron
*Attorney, Agent, or Firm*—Webb Ziesenheim Logsdon Orkin & Hanson, P.C.

[57] ABSTRACT

The object of the present invention is to provide a surface modified rubber and a seal material which enable obtaining a rubber molding being excellent in nonadherence, low friction, abrasion resistance and plasma resistance while retaining strength, compression set, sealing capability and deformation follow-up properties inherently possessed by a rubber material. The process for producing a surface modified rubber according to the present invention comprises contacting a treatment liquid containing a monomer having a polymerizable double bond, a polymerization initiator and a solvent with a rubber base material; and heating the thus contact treated rubber base material so that the monomer is polymerized to thereby modify the rubber base material at its surface and vicinity thereof.

13 Claims, 2 Drawing Sheets

Principle of ball indenter friction tester

PROCESS FOR PRODUCING SURFACE-MODIFIED RUBBER, SURFACE-MODIFIED RUBBER, AND SEALING MATERIAL

This application is the national stage of International Application PCT/JP 97/04831, filed Dec. 25, 1997.

FIELD OF THE INVENTION

The present invention relates to a process for producing a surface modified rubber, a surface modified rubber and a seal material. More particularly, the present invention is concerned with a process for producing a surface modified rubber which enables obtaining a rubber being excellent in low friction, nonadherence, abrasion resistance and plasma resistance while retaining compression set, rubber elasticity, mechanical strength and deformation follow-up properties inherently possessed by a rubber material and is concerned with such a surface modified rubber and a seal material obtained from the surface modified rubber.

BACKGROUND ART

Rubber moldings are widely used as seal materials in, for example, chemical equipment, semiconductor producing apparatus, chemical liquid piping and tanks and food producing apparatus.

The rubber moldings are endowed with low friction, nonadherence and abrasion resistance by the following method (1) or (2) in which the rubber material per se is modified or by any of the following methods (3) to (5) in which the surface or vicinity thereof of the rubber material is modified.

In method (1), powder of a resin such as PE, PTFE, POM or a polyester is mixed in the rubber material (solid lubricant adding method).

In method (2), an oil such as PEG, silicone oil or fluorooil is mixed in the rubber material (bleed method).

In method (3), the surface of rubber molding is covered with a resin (surface covering method).

In method (4), the surface of rubber molding is impregnated with a crosslinking agent and heated so that the crosslinking proceeds in the vicinity of the rubber surface (crosslinking agent infiltrating method). In method (5), a monomer which is compatible with the rubber is infiltrated from the surface into the internal part of the rubber molding and polymerized so that the surface vicinity is cured (surface polymerization curing method; see Japanese Patent Laid-open Publication No. 4(1992)-202239).

In the above solid lubricant adding method (1), for example, the solid lubricant mixed in the rubber material hardly comes out on the surface of the rubber molding, so that the functions such as low function and nonadherence cannot be satisfactorily performed. When, in this solid lubricant adding method, a large amount of solid lubricant is added to the rubber base material in order to improve the above functions of the rubber material surface, the mechanical strength and rubber elasticity of the obtained rubber molding are likely to decrease to thereby deteriorate the follow-up to opposite material, and further the compression set thereof tends to increase even if the above functions can be improved.

In the bleed method (2), the mechanical strength of obtained rubber molding is deficient. Further, the bleeding rate of oil mixed in the rubber material is large, and the lubricity of the rubber molding surface varies in conformity with the bleeding rate. After the completion of the bleeding, phenomena such as rapid increase of the friction coefficient of the rubber molding are encountered. Thus, the rubber molding cannot retain stable lubricity for a prolonged period of time. Still further, there is a problem such that oil having bled from the rubber molding stains the opposite material.

In the surface covering method (3), there is the danger that the mutual adherence of the rubber molding and the surface covering layer which constitute the obtained resin covered molding deteriorates, so that the resin covered molding is unsuitable for practical assembly in apparatus as a sealing member for use in dynamic conditions. Further, the rubber elasticity of the resin covered molding surface tends to lower to thereby cause the follow-up to opposite material to deteriorate.

While in the methods (1) to (3) it is intended to perform the functions such as low friction and nonadherence by furnishing the surface of the rubber material with a substance capable of lowering a surface energy of rubber molding by interposition or covering or by blending the substance with the rubber material, it is intended in the crosslinking agent infiltrating method (4) to perform the above functions by crosslinking the vicinity of surface of the rubber material to thereby increase the surface hardness and, hence, reduce primarily the area of contact with opposite surface. However, in the crosslinking agent infiltrating method (4), the composition per se of the rubber molding surface is not different from that of other parts, so that the level of function performance depends on the degree of surface crosslinking. When, thus, the crosslinking of the vicinity of surface (surface layer) of the rubber material is advanced for raising the level of function performance, not only does cracking progress at the surface of the rubber molding but also the deformation follow-up to opposite surface is deteriorated. Therefore, there is the problem that the use of the above rubber molding as a sealing member is likely to cause leakage.

As described in Japanese Patent Laid-open Publication No. 4(1992)-202239, in the surface polymerization curing method (5), the monomers which are infiltrated in the rubber material and polymerized are limited to those having compatibility with the rubber material. Only monomers such as (meth)acrylic acid or a derivative thereof whose molecular weight is relatively small so as to be able to diffuse into rubber network chains can effectively diffuse into the vicinity of surface of the rubber material. The poorer the compatibility between rubber material and monomer (the greater the solubility index difference) and the greater the molecular weight of monomer, the more difficult will it be to infiltrate and diffuse the monomer into the vicinity of surface of the rubber material. Thus, it will also be the more difficult to realize effective performance of the functions such as low friction, nonadherence and abrasion resistance at the surface of the rubber molding.

Accordingly, it is presumed that, if a silicon monomer or a fluoromonomer can be used as the monomer in the surface polymerization curing method (5), the surface energy of the rubber molding would be markedly reduced to thereby be most effective in the performance of the functions such as low friction, nonadherence, abrasion resistance and sealing properties. However, combinations of such a monomer with most rubbers have poor compatibility with each other. For example, combinations of a silicon monomer with HNBR (hydrogenated acrylonitrile-butadiene rubber or nitrile rubber), NBR (acrylonitrile-butadiene rubber, also usually known as nitrile rubber), SBR, (styrene-butadiene rubber), ACM (copolymer of ethyl acrylate or other acrylates and a small amount of a monomer which facilitates vulcanizatio, usually known as acrylic rubber), FKM (fluoro rubber having substituents groups of fluoro, perfluoro, alkyl or perfluoroalkoxy on the polymer chain), CR (chloroprene rubber), CSM (chlorosulfonyl polyethylene), T (rubber having carbon, oxygen and sulfur in the polymer chain, i.e., polysulfide rubber), CO (polychloromethyl-oxirane, usually known as epichlorohydrin rubber), ECO (copolymer of ethylene oxide (oxirane) and chloromethyloxirane, also known as epochlorohydrin copolymer or rubber), ANM (copolymer of ethyl acrylate (or other acrylates) and acrylonitrile) and U (urethane rubber) and combinations of a fluoromonomer with HNBR, NBR, Q (silicone rubber), SBR, ACM, CR, CSM, T, CO, ECO, ANM and U have poor compatibility with each other.

Therefore, in the surface polymerization curing method (5), it is infeasible to infiltrate and diffuse the silicon monomer or fluoromonomer into the vicinity of surface of any of a wide variety of rubber materials and effect a polymerization thereof so as to obtain a rubber molding which is excellent in low friction, nonadherence, abrasion resistance, etc. Moreover, in this surface polymerization curing method (5), when the surface hardness of obtained rubber molding is increased, minute cracks are likely to occur on the surface and the deformation follow-up to opposite surface tends to decrease as in the above crosslinking agent infiltrating method (4). Therefore, there is the danger of deterioration of sealing properties.

As apparent from the above, the method of modifying the rubber material per se, such as the solid lubricant adding method (1) or the bleed method (2), has drawbacks in that it is infeasible to modify the surface or vicinity thereof of rubber material alone and that the properties attributed to the rubber material of the obtained rubber molding, such as mechanical strength, compression set and rubber elasticity, per se are deteriorated by the addition of the solid lubricant, etc. to the rubber material.

On the other hand, the method of modifying the surface or vicinity thereof of rubber material, such as the surface covering method (3), the crosslinking agent infiltrating method (4) or the surface polymerization curing method (5), has drawbacks in that the vicinity of surface of obtained rubber molding is cured to thereby have minute cracks and that the deformation follow-up to opposite surface is deteriorated. Further, the surface covering method (3) has another drawback in that the covering material having properties different from those of the rubber material lacks the compatibility with the inner rubber material, so that it cannot be fixed on the surface of the inner rubber material to thereby cause the adherence of the surface covering layer to the rubber material to be poor.

Japanese Patent No. 2,536,777 (Japanese Patent Laid-open Publication No. 1(1989)-301725) discloses a process for producing a nonadherent fluoroelastomer which comprises the steps of vulcanizing a fluoroelastomer to thereby form double bonds in the fluoroelastomer, infiltrating a reactive silicone resin in the surface of the fluoroelastomer and reacting the infiltrated reactive silicone resin with the fluoroelastomer. It is also disclosed that the infiltration of the reactive silicone resin in the surface of the fluoroelastomer can be effected by dissolving the reactive silicone resin in a solvent such as acetone to thereby obtain a reactive silicone resin solution and immersing the fluoroelastomer in the solution. However, in this process, the rubber which can be treated for surface nonadherence is limited to the fluoroelastomer having double bonds introduced therein, and the type of surface modifying agent usable in the surface treatment is also limited. In this patent (Japanese Patent No. 2,536,777), the reactive silicone resin is used as the surface treating agent. This silicone resin is a polymeric compound, so that, even if the rubber base material is swollen in a solvent as listed in the patent, it is difficult to infiltrate the silicone resin from the rubber surface into the internal part because the molecular weight thereof is too large.

The inventors have made extensive and intensive studies with a view toward solving the problem of how to cause a variety of polymeric compounds whose capability of modifying a rubber surface can be anticipated, inclusive of polymeric compounds set forth as the surface modifier in the above cited patent, to be present in not only the rubber surface but also the rubber surface layer (internal part of the rubber) so as to effectively attain a rubber surface modification. Thus, it has been found that, although the penetration (infiltration) of the polymeric compound per se together with a solvent into the internal part of the rubber as described in the above patent literature involves difficulty, the monomer thereof has a small molecular weight and can be easily infiltrated in the rubber and that, when a polymerizable double bond is present in the monomer, the solubility of the monomer in the polymer generally tends to increase. It has also been found that, when a monomer having a polymerizable double bond which forms a polymeric compound, as a surface modifier, is infiltrated in a rubber swollen by a solvent and polymerized in the rubber, there can be obtained a surface modified rubber which, while retaining the properties such as compression set inherently possessed by the rubber material, is excellent in low friction, nonadherence, abrasion resistance and plasma resistance and can perform the functions attributed to the structure of employed monomer, such as ozone and oil swell resistances. The present invention has been accomplished on the basis of the above findings.

Among rubber moldings composed of various materials, fluoroelastomer moldings are particularly advantageous in that these are excellent in resistances to heat, chemicals and plasma and the polymer per se is stable and in that impurities causing contamination of a semiconductor product or the like, such as an antioxidant generally employed in other rubber materials, are not contained therein so that the fluoroelastomer moldings are excellent in purity of material per se. Therefore, the fluoroelastomer moldings are used as seal materials in liquid crystal/semiconductor producing apparatus, food industry, etc.

However, when used, for example, by being fitted in a moving part of apparatus, the fluoroelastomer molding exhibits the property of tending to stick to opposite material (i.e., sticking tendency or adherence). Thus, the fluoroelastomer molding has a drawback of being inferior in apparatus closing/opening efficiency to other moldings. Moreover, the higher the temperature at which the fluoroelastomer seal material is used, the more conspicuous the sticking tendency. Thus, the conventional fluoroelastomer moldings leave room for improvement in respect of, for example, low friction and nonadherence in the use as a seal material in liquid crystal/semiconductor producing apparatus, food industry, etc. which is often used at ordinary temperature or above. Moreover, in recent years, a plasma generator is used as a semiconductor device. The seal material of plasma treating units represented by a plasma generator is required to have plasma durability so that desired plasma can efficiently be generated in vacuum. The seal material is also required to have a property (low outgassing property) such that gas, etc. is not emitted from the seal material per se so that clean vacuum condition in, for example, a chamber can be maintained.

The present invention has been made with a view toward solving the above problems of the prior art. An object of the present invention is to provide a process for producing a surface modified rubber enabling obtaining a rubber molding which, while retaining the properties such as strength, compression set, sealing capability and deformation follow-up inherently possessed by the rubber material, is excellent in nonadherence, low friction, abrasion resistance and plasma resistance and can perform the functions attributed to the structure of employed monomer, such as ozone and oil resistances.

Another object of the present invention is to provide a surface modified rubber which, while retaining the properties such as strength, compression set, sealing capability and deformation follow-up inherently possessed by the rubber material, is excellent in nonadherence, low friction, abrasion resistance and plasma resistance and can perform the functions attributed to the structure of employed monomer, such as ozone and oil resistances. A further object of the present invention is to provide a seal material comprising the above surface modified rubber.

SUMMARY OF THE INVENTION

The process for producing a surface modified rubber according to the present invention comprises:

contacting a treatment liquid (a) containing a monomer having a polymerizable double bond, a polymerization initiator (preferably, a radical polymerization initiator) and a solvent with a rubber base material (b); and heating the thus contact treated rubber base material so that the monomer is polymerized to thereby modify the rubber base material at its surface and vicinity thereof.

In the process of the present invention, it is preferred that the polymerizable double bond having monomer be polymerized in the state, where polymerization initiator and polymerizable double bond having monomer are infiltrated in the rubber base material, by the contact of the treatment liquid with the rubber base material.

In the process of the present invention, the contact treated rubber base material is preferably heated in the presence of not more than $1.0\times10^{19}$ oxygen molecules per $cm^3$, still preferably, not more than $5.6\times10^{18}$ oxygen molecules per $cm^3$.

In the process of the present invention, the polymerizable double bond having monomer is preferably an ethylenically unsaturated fluorocompound and/or an ethylenically unsaturated organosiloxane. It is especially preferred that the polymerizable double bond having monomer be an ethylenically unsaturated organosiloxane.

In the process of the present invention, the rubber base material is preferably a fluoroelastomer.

In the process of the present invention, reaction is preferably performed in vacuum or an inert gas.

In the process of the present invention, the contact of the treatment liquid with the rubber base material is preferably conducted by immersing the rubber base material in the treatment liquid.

The surface modified rubber of the present invention is produced by the above process. The surface modified rubber is preferably used in a seal material. This seal material is preferably used in a liquid crystal/semiconductor producing apparatus, still preferably, a plasma treating apparatus.

By virtue of the present invention, there can be obtained the surface modified rubber which, while retaining the properties such as rubber elasticity, compression set, mechanical strength and deformation follow-up inherently possessed by the rubber material, is excellent in low friction, nonadherence, abrasion resistance and plasma resistance and can perform the functions attributed to the structure of employed monomer, such as ozone and oil swell (oil) resistances. Further, there can be obtained the seal material comprising the above surface modified rubber.

DETAILED DESCRIPTION OF THE INVENTION

Figure 1:
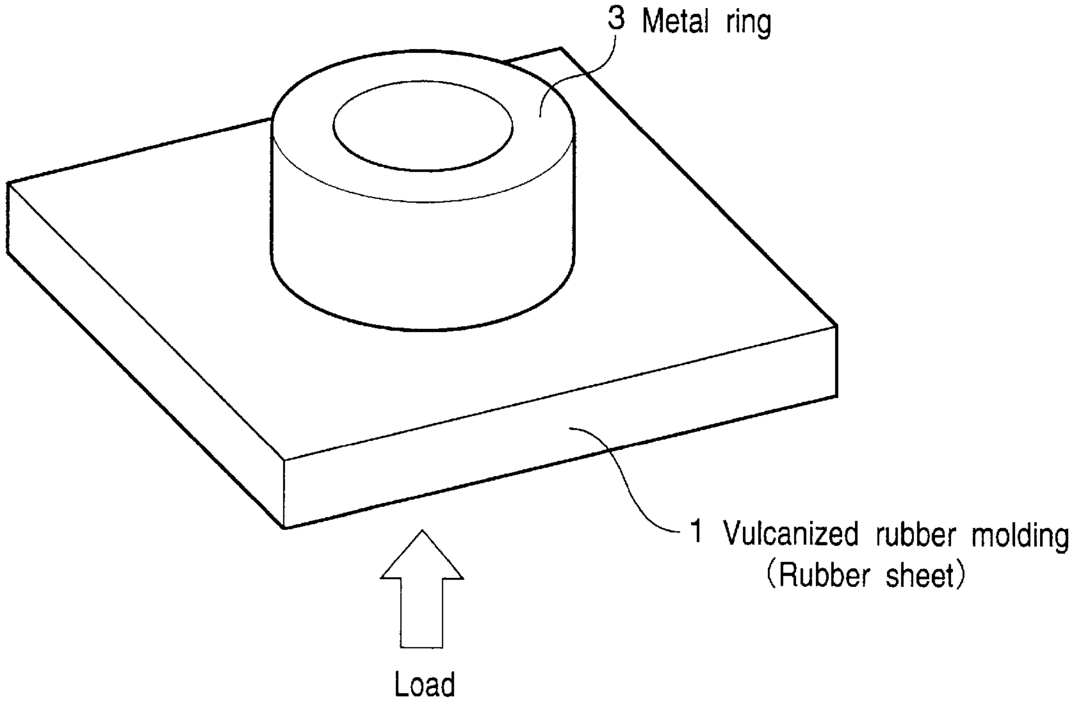
FIG. 1 is a perspective view illustrating the principle of friction abrasion tester (Matsubara friction abrasion tester) used in Examples and Comparative the Examples of the present invention.

The process for producing a surface modified rubber, surface modified rubber and seal material according to the present invention will be described in detail below.

The process of the present invention comprises:

contacting a treatment liquid (a) containing a monomer having a polymerizable double bond, a polymerization initiator (preferably, a radical polymerization initiator) and a solvent with a rubber base material (b); and heating the thus contact treated rubber base material so that the monomer is polymerized to thereby modify the rubber base material at its surface and internal part (especially in the vicinity of the surface thereof).

The treatment liquid (a) containing a monomer having a polymerizable double bond, a radical polymerization initiator and a solvent will first be described.

Treatment liquid (a):

Polymerizable double bond having monomer

The polymerizable double bond having monomer contained in the treatment liquid (a) is a monomer which has at least one polymerizable double bond in its molecular skeleton. This polymerizable double bond having monomer can be an ethylenically unsaturated fluorocompound (i) or an ethylenically unsaturated organosiloxane (ii). In the present invention, use can be made of either of the compounds (i) and (ii) or both of them.

The above ethylenically unsaturated fluorocompound and ethylenically unsaturated organosiloxane are monomers or macromonomers which have parts endowing the rubber molding with low friction, nonadherence and plasma resistance and parts exhibiting chemical reactivity at the time of heating subsequent to monomer infiltration. The infiltration of the treatment liquid (a) containing component (i) and/or component (ii) into the rubber base material, followed by the heating, enables producing the rubber molding which is excellent in abrasion resistance, low friction, nonadherence and plasma resistance. The terminology "amacromonomer" used herein, as in general, means a compound having a molecular weight of about hundreds to ten thousands and having a polymerizable functional group, which can be regarded as a monomer. Even if it is intended to infiltrate the above polymerizable double bond having monomer alone into a variety of rubber base materials, the infiltration cannot be attained because of the large molecular weight or the generally exhibited poor compatibility with the rubber base material. However, in the present invention, the rubber base material (b) is treated with the treatment liquid (a) in which the monomer, the polymerization initiator and the solvent compatible with both of these are mixed together, so that these components can satisfactorily be infiltrated into the rubber base material to thereby enable obtaining the above desirable rubber molding.

In particular, when the rubber molding is a seal material for use in a liquid crystal/semiconductor producing apparatus or a plasma treating apparatus, which is required to possess plasma resistance especially in the employment of oxygen or an oxygenic gas as the gas type, or a seal material for food industry, it is preferred that the above polymerizable double bond having monomer be an ethylenically unsaturated fluorocompound (i) or an ethylenically unsaturated organosiloxane (ii). The ethylenically unsaturated fluorocompound (i) contains in its molecular skeleton at least one member selected from among (poly)fluoroalkyls, (poly) fluoroalkylenes, (poly)fluoro ethers and the like, which can endow the rubber molding with low friction and nonadherence. Generally, fluoropolymers per se have plasma resisting properties (plasma resistance) greater than those of hydrocarbon rubbers. That is, if general synthetic rubbers other than fluoroelastomers (e.g., NBR, SBR, EPDM (ethylene-propylene-diore monomer) and the like) as a rubber base material are treated with the ethylenically unsaturated fluorocompound, the plasma resistance of the employed rubber base material can be enhanced. The advantage of using the ethylenically unsaturated organosiloxane over the use of the ethylenically unsaturated fluorocompound is a superior resistance to oxygen plasma.

The ethylenically unsaturated organosiloxane (ii) can be derived from a homopolymer or copolymer of an organosiloxane selected from among, for example, dimethylsiloxane, methylphenylsiloxane and trimethylfluoropropylsiloxane, which can endow the rubber base material with low friction, nonadherence and plasma resistance. The part derived from the above homopolymer or copolymer may be modified by the addition thereto of, for example, a long-chain alkyl, fluoroalkyl or alkylene oxide group. Also, the part derived from the organosiloxane homopolymer or copolymer may be modified by copolymerizing thereat a polymerizable monomer such as an alkylene oxide, silphenylene, silethylene or styrene or by binding thereto a polymer such as polycarbonate, nylon or polyurethane.

The above ethylenically unsaturated fluorocompound (i) and ethylenically unsaturated organosiloxane (ii) have a functional group having an ethylene (C=C) bond such as vinyl, vinylidene, isopropenyl or methacryloxypropyl, which exhibits chemical reactivity.

This ethylene bond having functional group may be present at one end or both ends of the ethylenically unsaturated fluorocompound (i) or ethylenically unsaturated organosiloxane (ii), or may be present in a side chain (branch) thereof. The number of ethylene bonds which are present in the ethylenically unsaturated fluorocompound (i) or ethylenically unsaturated organosiloxane (ii) is not particularly limited as long as it is at least 1.

Examples of the ethylenically unsaturated fluorocompounds (i) include:

(1) esters of (meth)acrylic acid and a fluoroalcohol having about 1 to 20, preferably, 2 to 15 and, still preferably, 8 to 15 carbon atoms [provided that the fluoroalcohol may have a branch of, for example, a lower alkyl having about 1 to 5 carbon atoms or —OH, and the principal chain carbon atoms of the alcohol may be substituted with, for example, "—$SO_2N(R)$—" wherein R represents a hydrogen atom or an alkyl having about 1 to 10 carbon atoms]; and (2) fluorinated unsaturated hydrocarbon compounds ther than the above esters (1) which contain about 1 to 5 ethylenic double bonds.

The molecular weight of the ethylenically unsaturated fluorocompounds (i) is generally in the range of about 100 to 10,000 (ten thousand), preferably, 150 to 5000 and, still preferably, 200 to 1000.

Specific examples of the ethylenically unsaturated fluorocompounds (i) include compound nos. (i-1) to (i-54) listed in the following Tables 1 to 5. The compound nos. (i-1) to (i-8) are included in the fluorinated unsaturated hydrocarbon compounds (2) and the other compounds are included in the esters (1).

Among the ethylenically unsaturated fluorocompounds (i) listed in Tables 1 to 5, the esters of (meth)acrylic acid and a fluoroalcohol (1) are preferred. Especially preferred use is made of compound nos. (i-11) to (i-14), (i-24) to (i-27), (i-30), (i-34), (i-36), (i-38), (i-40), (i-47) to (i-50), (i-53) and (i-54). These fluorocompounds can be used either individually or in combination. In the following tables, Me represents methyl and Ph represents phenyl.

TABLE 1

| | | |
|---|---|---|
| Olefins | (i-1): | (perfluorobutyl)ethylene<br>$F(CF_2)_4CH{=}CH_2$ |
| | (i-2): | (perfluorohexyl)ethylene<br>$F(CF_2)_6CH{=}CH_2$ |
| | (i-3): | (perfluorooctyl)ethylene<br>$F(CF_2)_8CH{=}CH_2$ |
| | (i-4): | (perfluorodecyl)ethylene<br>$F(CF_2)_{10}CH{=}CH_2$ |
| | (i-5): | 1-methoxy-(perfluoro-2-methyl-1-propene)<br>$(CF_3)_2C{=}CFOCH_3$ |
| | (i-6): | 1,4-divinyloctafluorobutane<br>$(CF_2)_4(CH{=}CH_2)_2$ |
| | (i-7): | 1,6-divinyldodecafluorohexane<br>$(CF_2)_6(CH{=}CH_2)_2$ |
| | (i-8): | 1,8-divinylhexadecafluorooctane<br>$(CF_2)_8(CH{=}CH_2)_2$ |

TABLE 2

| Methacrylates | |
|---|---|
| (i-9): | 2,2,2-trifluoroethyl methacrylate<br>$CF_3CH_2OOCC(CH_3){=}CH_2$ |
| (i-10): | 2,2,3,3,3-pentafluoropropyl methacrylate<br>$CF_3CF_2CH_2OOCC(CH_3){=}CH_2$ |
| (i-11): | 2-(perfluorobutyl)ethyl methacrylate<br>$F(CF_2)_4CH_2CH_2OOCC(CH_3){=}CH_2$ |
| (i-12): | 2-(perfluorohexyl)ethyl methacrylate<br>$F(CF_2)_6CH_2CH_2OOCC(CH_3){=}CH_2$ |
| (i-13): | 2-(perfluorooctyl)ethyl methacrylate<br>$F(CF_2)_8CH_2CH_2OOCC(CH_3){=}CH_2$ |
| (i-14): | 2-(perfluorodecyl)ethyl methacrylate<br>$F(CF_2)_{10}CH_2CH_2OOCC(CH_3){=}CH_2$ |
| (i-15): | 2-(perfluoro-3-methylbutyl)ethyl methacrylate<br>$(CF_3)_2CF(CF_2)_2CH_2CH_2OOCC(CH_3){=}CH_2$ |
| (i-16): | 3-(perfluoro-3-methylbutyl)-2-hydroxypropyl methacrylate<br>$(CF_3)_2CF(CF_2)_2CH_2CH(OH)CH_2OOCC(CH_3){=}CH_2$ |
| (i-17): | 2-(perfluoro-5-methylhexyl)ethyl methacrylate<br>$(CF_3)_2CF(CF_2)_4CH_2CH_2OOCC(CH_3){=}CH_2$ |
| (i-18): | 3-(perfluoro-5-methylhexyl)-2-hydroxypropyl methacrylate<br>$(CF_3)_2CF(CF_2)_4CH_2CH(OH)CH_2OOCC(CH_3){=}CH_2$ |
| (i-19): | 2-(perfluoro-7-methyloctyl)ethyl methacrylate<br>$(CF_3)_2CF(CF_2)_6CH_2CH_2OOCC(CH_3){=}CH_2$ |
| (i-20): | 3-(perfluoro-7-methyloctyl)-2-hydroxypropyl methacrylate<br>$(CF_3)_2CF(CF_2)_6CH_2CH(OH)CH_2OOCC(CH_3){=}CH_2$ |

TABLE 2-continued

| Methacrylates | |
|---|---|
| (i-21): | 2-(perfluoro-9-methyldecyl)ethyl methacrylate $(CF_3)_2CF(CF_2)_8CH_2CH_2OOCC(CH_3)=CH_2$ |

TABLE 3

| | |
|---|---|
| (i-22): | 3-(perfluoro-9-methyldecyl)-2-hydroxypropyl methacrylate $(CF_3)_2CF(CF_2)_8CH_2CH(OH)CH_2OOCC(CH_3)=CH_2$ |
| (i-23): | 2,2,3,3-tetrafluoropropyl methacrylate $H(CF_2)_2CH_2OOCC(CH_3)=CH_2$ |
| (i-24): | 1H,1H,5H-octafluoropentyl methacrylate $H(CF_2)_4CH_2OOCC(CH_3)=CH_2$ |
| (i-25): | 1H,1H,7H-dodecafluoroheptyl methacrylate $H(CF_2)_6CH_2OOCC(CH_3)=CH_2$ |
| (i-26): | 1H,1H,9H-hexadecafluorononyl methacrylate $H(CF_2)_8CH_2OOCC(CH_3)=CH_2$ |
| (i-27): | 1H,1H,11H-icosafluoroundecyl methacrylate $H(CF_2)_{10}CH_2OOCC(CH_3)=CH_2$ |
| (i-28): | 2,2,2-trifluoro-1-trifluoromethylethyl methacrylate $(CH_3)_2CHOOCC(CH_3)=CH_2$ |
| (i-29): | 2,2,3,4,4,4-hexafluorobutyl methacrylate $CF_3CHFCF_2CH_2OOCC(CH_3)=CH_2$ |
| (i-30): | 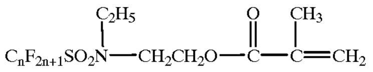 wherein n is about 7.5 (Fluorad FX 14 produced by Sumitomo 3M Co., Ltd.). |

TABLE 4

| Acrylates | |
|---|---|
| (i-31): | 2,2,2-trifluoroethyl acrylate $CF_3CH_2OOCCH=CH_2$ |
| (i-32): | 2,2,3,3,3-pentafluoropropyl acrylate $CF_3CF_2CH_2OOCCH=CH_2$ |
| (i-33): | 2,2,3,4,4,4-hexafluorobutyl acrylate $CF_3CCHFCF_2CH_2OOCCH=CH_2$ |
| (i-34): | 2-(perfluorobutyl)ethyl acrylate $F(CF_2)_4CH_2CH_2OOCCH=CH_2$ |
| (i-35): | 3-perfluorobutyl-2-hydroxypropyl acrylate $F(CF_2)_4CH_2CH(OH)CH_2OOCCH=CH_2$ |
| (i-36): | 2-(perfluorohexyl)ethyl acrylate $F(CF_2)_6CH_2CH_2OOCCH=CH_2$ |
| (i-37): | 3-perfluorohexyl-2-hydroxypropyl acrylate $F(CF_2)_6CH_2CH(OH)CH_2OOCCH=CH_2$ |
| (i-38): | 2-(perfluorooctyl)ethyl acrylate $F(CF_2)_8CH_2CH_2OOCCH=CH_2$ |
| (i-39): | 3-perfluorooctyl-2-hydroxypropyl acrylate $F(CF_2)_8CH_2CH(OH)CH_2OOCCH=CH_2$ |
| (i-40): | 2-(perfluorodecyl)ethyl acrylate $F(CF_2)_{10}CH_2CH_2OOCCH=CH_2$ |
| (i-41): | 2-(perfluoro-3-methylbutyl)ethyl acrylate $(CF_3)_2CF(CF_2)_2CH_2CH_2OOCCH=CH_2$ |
| (i-42): | 3-(perfluoro-3-methylbutyl)-2-hydroxypropyl acrylate $(CF_3)_2CF(CF_2)_2CH_2CH(OH)CH_2OOCCH=CH_2$ |
| (i-43): | 2-(perfluoro-5-methylhexyl)ethyl acrylate $(CF_3)_2CF(CF_2)_4CH_2CH_2OOCCH=CH_2$ |

TABLE 5

| | |
|---|---|
| (i-44): | 2-(perfluoro-7-methyloctyl)ethyl acrylate $(CF_3)_2CF(CF_2)_6CH_2CH_2OOCCH=CH_2$ |
| (i-45): | 2-(perfluoro-9-methyldecyl)ethyl acrylate $(CF_3)_2CF(CF_2)_8CH_2CH_2OOCCH=CH_2$ |

TABLE 5-continued

| | |
|---|---|
| (i-46): | 2,2,3,3-tetrafluoropropyl acrylate $CHF_2CF_2CH_2OOCCH=CH_2$ |
| (i-47): | 1H,1H,5H-octafluoropentyl acrylate $H(CF_2)_4CH_2OOCCH=CH_2$ |
| (i-48): | 1H,1H,7H-dodecafluoroheptyl acrylate $H(CF_2)_6CH_2OOCCH=CH_2$ |
| (i-49): | 1H,1H,9H-hexadecafluorononyl acrylate $H(CF_2)_8CH_2OOCCH=CH_2$ |
| (i-50): | 1H,1H,11H-icosafluoroundecyl acrylate $H(CF_2)_{10}CH_2OOCCH=CH_2$ |
| (i-51): | 2,2,2-trifluoro-1-trifluoromethylethyl acrylate $(CF_3)_2CHOOCCH=CH_2$ |
| (i-52): | 2,2,3,4,4,4-hexafluorobutyl acrylate $CF_3CHFCF_2CH_2OOCCH=CH_2$ |
| (i-53): | 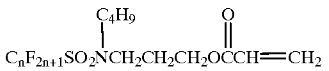 wherein n is about 7.5 (Fluorad FX 189 produced by Sumitomo 3M Co., Ltd.). |
| (i-54): | 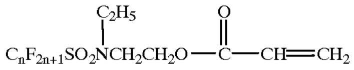 wherein n is about 7.5 (Fluorad FX 13 produced by Sumitomo 3M Co., Ltd.). |

Specific examples of the ethylenically unsaturated organosiloxanes (ii) include compound nos. (ii-1) to (ii-17) listed in the following Tables 6 to 10. As mentioned above, these ethylenically unsaturated organosiloxanes (ii) have a functional group having an ethylene bond (C=C) such as vinyl, isopropenyl or methacryloxy group.

Among the compounds (ii-1) to (ii-17), the compounds (ii-1) to (ii-7) are ethylenically unsaturated organosiloxanes (ii) having vinyl or isopropenyl at both ends thereof;

the compounds (ii-8) to (ii-13) are ethylenically unsaturated organosiloxanes (ii) having vinyl or isopropenyl at one end thereof;

and the compounds (ii-14) to (ii-17) are ethylenically unsaturated organosiloxanes (ii) having vinyl or isopropenyl at side chains thereof.

Among the compounds (ii-1) to (ii-17), preferred use is made of compounds (ii-1) to (ii-3) having vinyl at both ends thereof, compound (ii-7) having isoprenyl at both ends thereof and compounds (ii-10) and (ii-11) having isopropenyl at one end thereof.

The molecular weight of the ethylenically unsaturated organosiloxanes (ii) is generally in the range of 100 to 100 thousand, preferably, 200 to 50 thousand and, still preferably, 250 to 25 thousand.

The viscosity (measured at 25° C.) of the ethylenically unsaturated organosiloxanes (ii) is generally in the range of 1 to 20 thousand cSt, preferably, 2 to 15 thousand cSt and, still preferably, 3 to 5 thousand cSt.

These organosiloxanes can be used either individually or in combination.

TABLE 6

(ii-1)

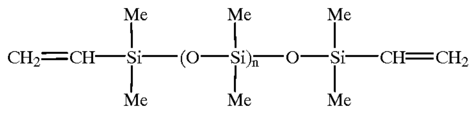

TABLE 6-continued (FM-2231, MW: 20,000, Viscosity: 1000) (both ends Siloprene Series produced by Chisso Corporation)
(FM-2241, MW: 40,000, Viscosity: 10,000) (both ends Siloprene Series produced by Chisso Corporation)
(FM-2242, Viscosity: 20,000) (both ends Siloprene Series produced by Chisso Corporation)

(ii-2)

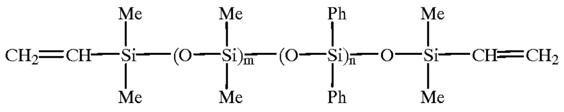

(FP-2231, Viscosity: 1000, m = 95%, n = 5%) (both ends Siloprene Series produced by Chisso Corporation)
(FP-2241, Viscosity: 10,000, m = 90%, n = 10%) (both ends Siloprene Series produced by Chisso Corporation)
(FP-2242, Viscosity: 20,000, m = 85%, n = 15%) (both ends Siloprene Series produced by Chisso Corporation)

(ii-3)

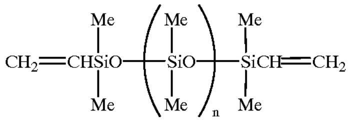

(Polymn. Deg. (n = about 4): TSL9646, (n = about 8): TSL9686) (both end functional group long chain series produced by Toshiba Silicone Co., Ltd.).

(ii-4)

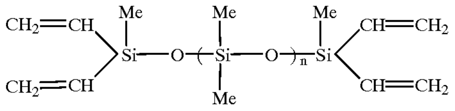

(η = 1000, 10,000) (produced by Chisso Corporation).

TABLE 7

(ii-5)

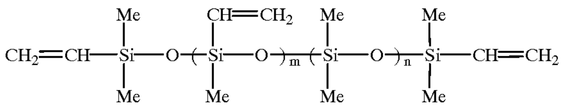

(m = 0.3 to 0.4%, η = 1000) (produced by Chisso Corporation), (ii-6)

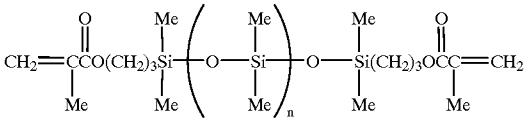

(FM-77 grade, Siloprene Series produced by Chisso Corporation), (ii-7)

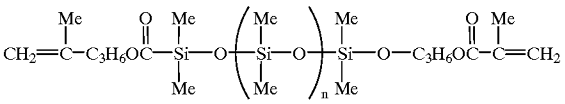

(n = 40,60) (TSL Series produced by Toshiba Silicone Co., Ltd.).
(n = 40, MW: about 1000) (X-22-164B, X-22164C Series, produced by Shin-Etsu Chemical Co., Ltd.)
(n = 64, MW: about 5000) (Siloprene FM77 Series produced by Chisso Corporation), TABLE 7-continued (ii-8)

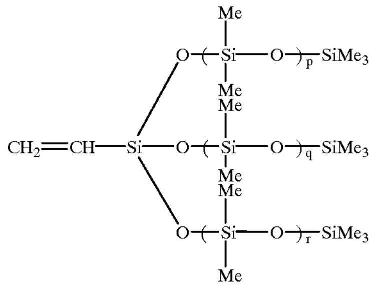

(branching point 2 to 3, η = 50 to 75) (produced by Chisso Corporation).

TABLE 8

(ii-9)

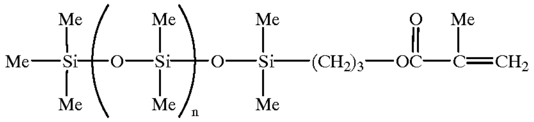

(TM0701, MW: 423, Viscosity (cp): 5, S.G.: 0.93)
(Siloprene FM07 Series produced by Chisso Corporation)
(FM0711, MW: 1000, n (calculated): 10, Viscosity (cp): 10, S.G.: 0.96)
(Siloprene FM07 Series produced by Chisso Corporation)
(FM0721, MW: 5000, n (calculated): 64, Viscosity (cp): 70, S.G.: 0.97)
(Siloprene FM07 Series produced by Chisso Corporation)
(FM0725, MW: 10,000, n (calculated): 131, Viscosity (cp): 160, S.G.: 0.97)
(Siloprene FM07 Series produced by Chisso Corporation)

(ii-10)

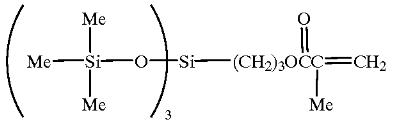

(TM-0701 grade, Siloprene Series produced by Chisso Corporation), (ii-11)

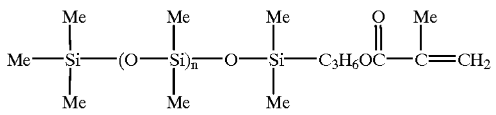

(FM-0711, MW: 1000, Viscosity: 10) (one end Siloprene Series produced by Chisso Corporation)
(FM-0721, MW: 5000, Viscosity: 70) (one end Siloprene Series produced by Chisso Corporation)
(FM-0725, MW: 10,000, Viscosity: 200) (one end Siloprene Series produced by Chisso Corporation).

TABLE 9

(ii-12)

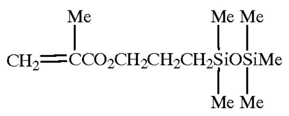

(TSL9705, MW: 274.5, sp.gr. ($d^{54}{}_{2}$): 0.905) (one end functional dimer series produced by Toshiba Silicone Co., Ltd.), TABLE 9-continued

| | |
|---|---|
| (ii-13) | 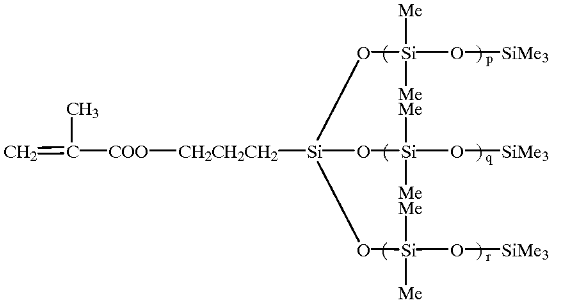 (branching point 2 to 3, η = 80 to 100) (PS404 produced by Chisso Corporation), |
| (ii-14) | 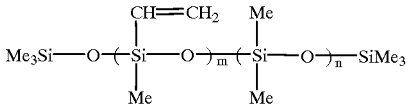 (m = 1%, n = 99%, η = 1000) (produced by Chisso Corporation) (m = 7.5%, n = 92.5%, η = 1000) (produced by Chisso Corporation) (m = 1.15%, n = 98.85%, η = 250) (produced by Chisso Corporation). |

TABLE 10

| | |
|---|---|
| (ii-15) | 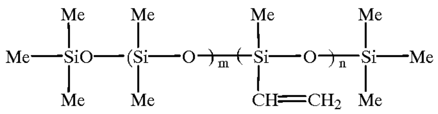 (Bx16-867, η = 1500) (Bx16-868, η = 1030) (produced by Toray Silicone Co., Ltd.), |
| (ii-16) | 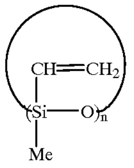 (n=3~6) (produced by Chisso Corporation), |
| (ii-17) | 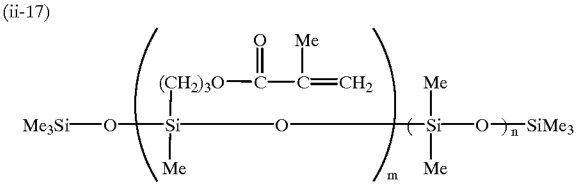 (m = 0.5 to 0.6%, η = 500,000) (produced by Chisso Corporation). |

Polymerization Initiator

Although various conventional polymerization initiators such as a radical polymerization initiator, a cation polymerization initiator and an anion polymerization initiator can be used, a radical polymerization initiator is preferably employed in the present invention.

As the radical polymerization initiator, there can be mentioned, for example, an inorganic or organic peroxide, an azo compound, an organometal compound or a metal. The inorganic or organic peroxide is, for example, 3,5,6, -trichloroperfluorohexanoyl peroxide, ammonium persulfate or hydrogen peroxide. The azo compound is, for example, azobisisobutyronitrile. The metal is, for example, Li, K, Na, Mg, Zn, Hg or Al. Of these, an organic peroxide is preferably used.

Specific examples of suitable organic peroxides include dicumyl peroxide, 2,4-dichlorobenzoyl peroxide, di-t-butyl peroxide, t-butyl cumyl peroxide, benzoyl peroxide, 2,5-dimethyl-2,5-di(t-butylperoxy)hexyne-3, 2,5-dimethyl-2,5-di(benzoylperoxy)hexane, 2,5-dimethyl-2,5-di(t-butylperoxy)hexane, α,α'-bis(t-butylperoxy-m-isopropyl) benzene, t-butylperoxyisopropyl carbonate, p-chlorobenzoyl peroxide and t-butyl perbenzoate.

Of these, 2,4-dichlorobenzoyl peroxide, dicumyl peroxide, benzoyl peroxide and α,α'-bis(t-butylperoxy-m-isopropyl)benzene are preferably used.

The above organic peroxides can be used either individually or in combination.

Solvent

A wide variety of solvents can be used without any particular limitation as long as they can dissolve polymerizable double bond having monomers and polymerization initiators and can swell the rubber base material because polymerizable double bond having monomers whose compatibility with the rubber base material is poor, employed either individually or in combination, can easily be infiltrated (penetrate) and diffused in the internal part of the rubber base material.

Although in the present invention the solvents can be used as long as the above functions can be performed irrespective of the amount of dissolved polymerizable double bond having monomer (level of solubility) and the degree of swelling of rubber base material, it is preferred to use solvents which realize a high solubility of polymerizable double bond having monomer and a high degree of swelling of rubber base material.

For example, solvents suitably used in the present invention are those which can dissolve the polymerizable double bond having monomer generally in an amount of at least 0.005 part by weight, preferably, at least 0.05 part by weight and, still preferably, at least 0.1 part by weight at 20° C. per 100 parts by weight of solvent.

Specific examples of solvents which can be employed in the present invention include:

- ketones such as acetone and MEK (methyl ethyl ketone);
- aliphatic and aromatic hydrocarbons such as hexane, heptane, toluene, xylene, THF(tetrahydrofuran), benzene, ligroin and isoparaffin;
- freons (halogenated hydrocarbons) such as chlorotrifluoromethane ($CClF_3$) and $CClF_2—CF_3$;
- alcohols such as isopropyl alcohol, ethanol and methanol;
- water;
- ethers such as dioxane, ethyl ether and isopropyl ether; and
- esters such as methyl acetate, ethyl acetate, isopropyl acetate and butyl acetate. These solvents may be used either individually or in combination. A Suitable solvent is selected in conformity with the employed rubber base material.

The solvent is finally removed from the rubber base material by, for example, evaporation. The time at which the removal is made is not particularly limited and may be during or after the monomer reaction. However, when the solvent participates in some bond in the surface or internal part of the rubber base material, the removal of the solvent can be dispensed with.

The treatment liquid (a) may further contain methyl hydrogen silicone oil and the like. The use of this treatment liquid enables further enhancing the low friction and non-adherence of the obtained rubber molding, depending on the opposite material.

In particular, when the rubber base material is composed of fluoroelastomer (FKM rubber) as mentioned below, the incorporation of methyl hydrogen silicone oil into the treatment liquid (a) favorably increases the nonadherence of the surface modified rubber especially in the use of aluminum or SUS in the opposite material.

In the present invention, the treatment liquid (a) contains the polymerizable double bond having monomer generally in a concentration ranging from 0.1 to 10,000 parts by weight, preferably, 1 to 100 parts by weight and, still preferably, 1 to 50 parts by weight per 100 parts by weight of solvent.

Further, the treatment liquid (a) contains the olymerization initiator, especially, radical olymerization initiator generally in a concentration anging from 0.01 to 10,000 parts by weight, preferably, 0.1 to 1000 parts by weight and, still preferably, 0.5 to 100 parts by weight per 100 parts by weight of solvent.

When the concentration of the polymerizable double bond having monomer is less than 0.1 part by weight per 100 parts by weight of solvent, the amount of the monomer present on the treated surface of the rubber base material is too small. On the other hand, when the above concentration exceeds 10,000 parts by weight, the rubber base material swelling effect of the solvent is reduced with the result that the effective infiltration and diffusion of the monomer into the rubber surface and vicinity thereof (i.e., internal part of the rubber base material) tend to become unattainable.

When the concentration of the polymerization initiator is less than 0.01 part by weight per 100 parts by weight of solvent, the concentration of formed radicals is too low with the result that it is infeasible to polymerize the monomer at the surface of the rubber base material and the vicinity thereof and effectively immobilize the formed polymer in the rubber molecular chains at the surface of the rubber base material and the vicinity thereof (internal part). On the other hand, when the concentration exceeds 10,000 parts by weight, the amount of component attributed to the polymerization initiator is too large at the rubber surface and the vicinity thereof with the result that the adherence decreasing effect of the part attributed to the chemical structure of the monomer, for example, siloxane bond is reduced. Concurrently, it would also result that, although the polymerization initiator is originally added for polymerizing the monomer and immobilizing the resultant polymer in the rubber base material (also referred to as "reaction immobilization"), the amount of polymerization initiator consumed in the crosslinking reaction conducted in the vicinity of rubber surface is increased in accordance with the increase of the concentration thereof so that cracking is likely to be induced at the vicinity of rubber surface to thereby deteriorate the sealing properties. Thus, when the concentration falls outside the above ranges, without exception, the low friction, nonadherence and abrasion resistance inducing effect are likely to be extremely poor.

In the present invention, as described above, the surface of rubber base material or vicinity thereof (i.e., internal part of the rubber base material) is modified by contacting the above treatment liquid, which contains a monomer having a polymerizable double bond, a polymerization initiator and a solvent, with the rubber base material; and polymerizing the polymerizable double bond having monomer in the state, where polymerization inhibitor and polymerizable double bond having monomer are infiltrated (have penetrated) in the rubber base material. Although the mechanism thereof has not yet been elucidated, it is now presumed that the polymerization of the polymerizable double bond having monomer is initiated at the surface of rubber base material or in the internal part of rubber base material by the polymerization initiator to thereby form a polymer and this polymer partly interwinds the rubber molecule chains or rubber molecule network constituting the rubber base material to thereby be immobilized in the rubber base material, and that, in some conditions, the reaction between part of the polymerizable double bond having monomer or part of the above polymer and the rubber base material occurs to thereby immobilize the monomer or polymer in the rubber base material with the result that the modification of the surface or vicinity thereof of the rubber base material is carried out.

The methyl hydrogen silicone oil being optionally added is used in a concentration ranging from 0 to 10,000 parts by weight, preferably, 0 to 100 parts by weight and, still preferably, 0 to 50 parts by weight per 100 parts by weight of solvent.

Rubber Base Material

With respect to the rubber base material (b) for use in the present invention, the type of material, configuration and size thereof are not particularly limited and various conventional rubber base materials can be employed.

The rubber base material can be composed of, for example, NBR, HNBR, SBR, ACM, U, FKM, Q, CR, NR (natural rubber), IIR (isobutylene-isoprene rubber) or BR (butadiene rubber). The use of a peroxide crosslinkable rubber base material among the above rubber base materials is preferred from the viewpoint that the polymerization of the monomer and the immobilization thereof in the rubber base material can more effectively be carried out to thereby ensure the performance of the functions such as nonadherence, low friction, abrasion resistance and plasma resistance.

When the peroxide crosslinkable rubber base material is used in the present invention, it is presumed that not only is the monomer polymerized but also the monomer undergoes a radical reaction which effects grafting of rubber molecule chains and/or crosslinking between rubber molecule chains in the rubber base material with the result that the performance of the functions such as abrasion resistance, low friction, nonadherence and plasma resistance can more effectively be carried out at the surface of rubber base material or vicinity thereof.

It is especially preferred in the present invention that the above peroxide crosslinkable rubber base material be composed of a fluoroelastomer (FKM) from the viewpoint that the nonadherence, abrasion resistance, compression set, etc. are improved.

Examples of suitable fluoroelastomers (FKM) include:

(1) thermoplastic fluoroelastomers;

(2) tetrafluoroethylene/perfluoroalkyl vinyl ether copolymers;

(3) tetrafluoroethylene/propylene copolymer;

(4) binary vinylidene fluoride rubbers such as vinylidene fluoride/hexafluoropropylene copolymer, vinylidene fluoride/trifluorochloroethylene copolymer and vinylidene fluoride/pentafluoropropylene copolymer; and (5) ternary vinylidene fluoride rubbers such as vinylidene luoride/tetrafluoroethylene/hexafluoropropylene opolymer, vinylidene fluoride/tetrafluoroethylene/perfluoroalkyl vinyl ether copolymers and vinylidene fluoride/tetrafluoroethylene/propylene copolymers. The above thermoplastic fluoroelastomers (1) may be those crosslinked by radiation, etc. Also, the tetrafluoroethylene/perfluoroalkyl vinyl ether copolymers (2) may be those crosslinked by radiation, etc. Examples of these radiation crosslinked products include “Kalrez” produced by E.I. Du Pont De Nemours and Company and “Perflon” produced by Daikin Industries, Ltd.

The thermoplastic fluoroelastomers of the invention have the following characters.

The thermoplastic fluoroelastomers for use in the present invention comprise elastomeric polymer chain segments and nonelastomeric polymer chain segments, at least either of these being fluoropolymer chain segments. Although at temperatures close to room temperature the plastic deformation of elastomeric polymer chain segments is inhibited in some form or other so that the rubber elasticity is exhibited, the thermoplastic fluoroelastomer exhibits plastic deformation when the hard block composed of nonelastomeric polymer chain segments is softened in accordance with the rise of the temperature.

In the above thermoplastic fluoroelastomers, the weight ratio [(i)/(ii)] of elastomeric polymer chain segments (i) to nonelastomeric polymer chain segments (ii) is preferably in the range of 40 to 95/60 to 5, still preferably, 70 to 90/30 to 10 (provided that (i)+(ii)=100 parts by weight).

The above thermoplastic fluoroelastomer consists, for example, of a chain composed of elastomeric polymer chain segments (i) and nonelastomeric polymer chain segments (ii), an iodine atom disposed at one end of the chain and a residue disposed at the other end of the chain, the residue derived by subtracting at least one iodine atom from an iodide compound.

The elastomeric polymer chain segment (i) is:

(1) vinylidene fluoride/(hexafluoropropylene or pentafluoropropylene)/tetrafluoroethylene copolymer (molar ratio: 40 to 90/5 to 50/0 to 35), or (2) perfluoroalkyl vinyl ether/tetrafluoroethylene/vinylidene fluoride copolymer (molar ratio: 15 to 75/0 to 85/0 to 85), having a molecular weight of 30,000 (30 thousand) to 1,200,000 (1.20 million).

The nonelastomeric polymer chain segment (ii) is:

(3) vinylidene fluoride/tetrafluoroethylene copolymer (molar ratio: 0 to 100/0 to 100), or (4) ethylene/tetrafluoroethylene/[hexafluoropropylene, 3,3,3-trifluoropropylene-1, 2-trifluoromethyl3,3,3-trifluoropropylene-1 or perfluoroalkyl vinyl ether] copolymer (molar ratio: 40 to 60/60 to 40/0 to 30), having a molecular weight of 3,000 to 400,000 (400 thousand). Provided that the sum of the molar quantities of components of each of the above copolymers is 100 mol without exception. Among the above thermoplastic fluoroelastomers, preferred use is made of one comprising a combination of elastomeric polymer chain segment (1) with nonelastomeric polymer chain segment (4).

Details of these thermoplastic fluoroelastomers are given in Japanese Patent Laid-open Publication No. 53(1978)-3495 and Japanese Patent Publication No. 6(1994)-53823. Relevant elastomers are commercially available, for example, from Daikin Industries, Ltd. by the trade name of Dai-el Thermoplastic and also from Nippon Valcar Kogyo K.K. by the tradename of “Valflon Crystal Rubber” (both crosslinked by electric discharge).

The fluoroelastomer (FKM) for use in the present invention is not limited as long as it contains any of the polymers (1) to (5). Units derived from other monomers may be introduced in the fluoroelastomer, and each of the polymers (1) to (5) may be one modified. Any one or at least two selected from among the polymers (1) to (5) may be contained in the fluoroelastomer.

The rubber base material for use in the present invention may be shaped into any configuration not limited and arbitrarily changeable in conformity with the use, such as the form of a sheet, a plate, a rod, a ring or a variable complex block.

Contact Treatment

In the present invention, the rubber base material (b) is brought into contact with the treatment liquid (a) containing a monomer having a polymerizable double bond, a polymerization initiator (preferably, radical polymerization initiator) and a solvent.

The contacting of the rubber base material (b) with the treatment liquid (a) can be conducted by the use of various conventional methods including the method of immersing the rubber base material in the treatment liquid, applying the treatment liquid to the rubber base material, the method of spraying the treatment liquid and the method of coating with a brush or the like. The method of immersing the rubber base material (b) in the treatment liquid (a) is especially preferred.

When the rubber base material is contacted with the treatment liquid, solvent molecules of the treatment liquid infiltrate and diffuse into the rubber base material, with which the monomer and the polymerization initiator infiltrate and diffuse into the rubber base material. Thus, the rubber base material slowly swells.

The amount of treatment liquid infiltrated in the rubber base material and the degree of swelling of the rubber base material depend on the type and molecular weight of the monomer contained in the treatment liquid, the type of the rubber, the crosslinking density of the rubber, the type of the polymerization initiator, the type of the solvent, the concentration of the treatment liquid, the time of contact of the rubber base material with the treatment liquid (immersion time), the immersion temperature, the period of storage from the contact with the treatment liquid to the heating, etc. and cannot be sweepingly determined.

In the present invention, when the rubber base material (b) is contacted with the treatment liquid (a) containing a monomer having a polymerizable double bond, a polymerization initiator and a solvent in the above respective amounts, for example, at ordinary temperature, i.e., 15 to 25° C. under atmospheric pressure (1 atm), it is generally preferred that the contacting be performed for at least 0.1 sec, especially, 1 sec to about 1 month and, still especially, 1 sec to about 72 hr. Further, it is preferred that the contacting be performed by immersing the rubber base material (b) in the treatment liquid (a) under these conditions.

The following heating may be performed either immediately after the contacting treatment such as immersion or after the lapse of about one month thereafter. In the present invention, in the long-term immersion of the rubber base material (b) in the treatment liquid (a), the infiltration of the treatment liquid is advanced to a depth in conformity with the passage of time prior to reaching the equilibrium, and, after reaching the equilibrium swelling, the infiltration and diffusion apparently stop.

After the completion of the immersion, for example, the monomer of the treatment liquid (a) diffused and infiltrated in the surface and internal part of the rubber base material bleeds outside the rubber base material with the passage of time, so that it is needed to cause the monomer to contribute to the reaction at least before the diffused and penetrated (infiltrated) monomer completely bleeds out. For example, when it is desired to increase the thickness (depth) of monomer reaction-immobilization layer from the surface toward the internal part of the rubber base material, the following heating is preferably conducted as immediately as possible so as to induce a polymerization reaction such as radical polymerization reaction.

The bleeding rate of the treatment liquid (a) can be retarded by storing the rubber base material having undergone the contact treatment (contact treated rubber base material) at temperature which is lower than ordinary temperature, for example, +10 to −210° C. Accordingly, at such a low temperature, the solvent treated rubber base material can be stored in the state of being not yet subjected to the following heating, so that the period from the immersion to the heating is not particularly limited. However, at ordinary temperature under atmospheric pressure, the contact treated rubber base material can be stored before the heating for the above period, i.e., from 1 sec to about one month after contacting.

Heating

In the present invention, the modification of the surface and internal part (especially, the vicinity of rubber base material surface having the treatment liquid (a) infiltrated and diffused therein) of the rubber base material is carried out by heating the rubber base material (b) treated with the above treatment liquid (a) (contact treated rubber base material) to thereby activate the polymerization initiator, preferably, decompose the radical polymerization initiator so as to induce the radical reaction with the result that the monomer molecules are polymerized with each other or the monomer is reacted with the rubber base material.

The modification of the surface and internal part of the contact treated rubber base material is conducted in conditions (environment) such that the number of oxygen molecules present in 1 ml ($cm^3$) of volume (of either air space or liquid) is preferably not more than $1.0\times10^{19}$, still preferably, not more than $5.6\times10^{18}$. The smaller number of oxygen molecules present per unit volume, the more preferably because of effectively reacting and immobilizing the monomer.

The volume percentage of oxygen, exclusive of steam, of the atmosphere constituting chemical components is generally about 20.93%. Thus, about $5.6\times10^{18}$ oxygen molecules are present in 1 ml of the atmosphere whose temperature and pressure are 0° C. and 1 atm, respectively. That is, in preferred embodiment of the present invention, the pressure employed at the time of reaction is, for example, the atmospheric pressure or reduced pressure (not more than $5.6\times10^{18}$ oxygen molecules/ml, see item (B) below) as mentioned above.

In the present invention, the following methods (A) to (C) can preferably be employed for carrying out the above reaction at the above oxygen concentration.

In method (A), the reaction is conducted in a stream of carbon dioxide gas or an inert gas (e.g., nitrogen gas or helium gas) or in condition (environment) of a gas replaced by the above gas.

Although the type of gas used herein is not particularly limited as long as it does not inhibit the above polymerization reaction such as radical polymerization reaction, preferred use is made of the above gases such as carbon dioxide gas, nitrogen gas and helium gas.

In method (b), the reaction is conducted in condition such that the pressure is reduced so as to be not higher than the atmospheric pressure by the use of a vacuum pump, a suction pump or the like.

In method (c), the reaction is conducted in condition such that the oxygen concentration at the reaction site is lower than that of the atmosphere. For example, the reaction is conducted in a liquid such as an oil or a solvent, or the radical reaction is conducted by applying the above liquid to the surface of the rubber base material and heating the same.

The above methods may be employed either individually or in combination. Also, other methods (environments) can be employed without any particular limitation as long as the number of oxygen molecules present in 1 ml of air space is not more than $1.0\times10^{19}$, preferably, not more than $5.6\times10^{18}$.

In the present invention, although the heating treatment under the above conditions is not particularly limited as long as the polymerizable double bond having monomer which has infiltrated, penetrated and diffused in the rubber base material can be polymerized by, for example, radical reaction so as to be immobilized in the surface or internal part of the rubberbase material, it is generally conducted under conditions such that the temperature and duration are approximately 35 to 400° C. and 1 sec to 720 hr, preferably, 50 to 350° C. and 1 sec to 72 hr, respectively.

Upon the heating, the. polymerizable double bond having monomer which has infiltrated, penetrated and diffused in the rubber base material undergoes, for example, a radical reaction initiated by radical polymerization initiator decomposed by the heating so that the monomer is polymerized and immobilized in the surface and internal part of the rubber base material. When the monomer bleeding rate is not much increased and, as compared with this bleeding rate, the polymerization reaction rate is conspicuously increased by raising the heating temperature within the above range, the heating of the rubber base material is conducted at a higher temperature ranging, for example, from 100 to 300° C. so that the modification of the rubber base material can be effected to a greater depth.

Even if the same treatment liquid (a) is used, as mentioned above, the depth in which the polymerizable double bond having monomer of the treatment liquid (a) is reacted and immobilized, i.e., the distance from the surface of rubber base material toward the internal part depends on the concentration of the treatment liquid (a), the immersion time in the treatment liquid (a), the reaction rate, the bleeding rate of the monomer outside the rubber base material, etc. Thus, appropriately controlling of these factors enables regulating the depth of the treatment, namely, the thickness of the layer in which the monomer is polymerized and immobilized (reaction immobilization layer). For example, for carrying out the modification of the rubber base material to a greater depth of the rubber base material, it is appropriate to immerse the rubber base material (b) in the treatment liquid (a) for a prolonged period of time and to, after the immersion, conduct the heating as immediately as possible so that the polymerization reaction such as radical reaction is effected. In a system in which the increase of the radical reaction rate by the rise of the temperature is conspicuous as compared with that of the monomer bleeding rate, the increase of the heating temperature enables advancing the modification to a greater depth of the rubber base material.

For example, when a rubber base material with a thickness of about 2 mm, composed of HNBR rubber, is immersed in a treatment liquid consisting of 100 parts by weight of acetone, 5 to 20 parts by weight of methacrylic modified silicone oil (total when a plurality of such are used) and 0.5 to 3 parts by weight of dicumyl peroxide for about 1 to 4 min, taken out and heated in vacuum at 170° C. for about 3 hr, the depth (thickness) of the portion which can be judged as being apparently modified as a result of the modification treatment is generally about 600 $\mu$m or less from the surface of the HNBR. On the other hand, when a rubber base material with a thickness of about 2 mm, composed of FKM rubber, is immersed in a treatment liquid consisting of 100 parts by weight of acetone, 5 to 25 parts by weight of methacrylic modified silicone oil and 0.5 to 3 parts by weight of dicumyl peroxide for about 1 to 10 min, taken out and heated in vacuum at 170° C. for about 3 hr, the depth (thickness) of the portion which can be judged as being apparently modified by the modification treatment is generally about 1000 nm (nanometer) from the surface of the FKM.

Seal Material

Although the seal material of the present invention finds application in various uses and the use thereof is not limited to specified purposes, it is suitably used in, for example, liquid crystal and semiconductor producing apparatuses and food industry. For example, the seal material is preferably used in semiconductor producing apparatuses such as:

- a coater and developer, an etching apparatus (e.g., a plasma etching apparatus), a plasma ashing apparatus, a resist stripping apparatus and a cleaning and drying apparatus;
- a furnace casing of a lamp annealing apparatus and an oxidation/diffusion furnace;
- CVD apparatuses including a metal CVD apparatus, a lasma CVD apparatus and an LP-CVD apparatus and a puttering apparatus;
- various conveyors (e.g., a conveyor belt or a conveyor O-ring of wafer conveying equipment); various resist conveyors (e.g., a cap of resist conveyor vessel); and
- various inspection apparatus groups. Among these, the seal material is especially preferably used in the plasma etching apparatus, plasma ashing apparatus, plasma CVD apparatus and wafer conveying equipment as attachment of these apparatuses, which are required to have plasma resistance (these may be collectively referred to as "plasma treating apparatus").

Further, the seal material of the present invention is preferably used in liquid crystal producing apparatuses such as:

- a sputtering apparatus;
- CVD apparatuses (e.g., a plasma CVD and a laser CVD);
- etching apparatuses (e.g., a dry etching apparatus and a wet etching apparatus);
- a stripping apparatus;
- an oxidation/diffusion/ion injection apparatus;
- vapor deposition apparatuses (e.g., a vacuum vapor deposition apparatus and a vapor deposition polymerization apparatus);
- cleaning apparatuses (a dry cleaning system and a et cleaning apparatus);
- various inspection apparatuses (e.g., a mask nspection apparatus and a pattern inspection apparatus);
- exposure apparatuses (a proximity system and a stepper system);
- annealing apparatuses (e.g., a lamp annealing apparatus and an Ekishima laser annealing apparatus); various conveyor apparatus groups; and
- a liquid crystal injecting apparatus.

The seal material of the present invention finds application in other uses and is used in, for example,: a spin coater, a glass polishing apparatus, a color filter electrodeposition apparatus, a dryer, a resist baking apparatus, a firing apparatus, a chemicals feeder, a sealing apparatus, an ion doping apparatus, an ion shower apparatus, an ion mixing apparatus and a laser repair apparatus.

Although the terminology "plasma resistance" used herein means a durability not limited to specified types; of plasmas, the seal material of the present invention exhibits excellent durability to oxygen plasma or oxygen containing plasma especially when a silicone monomer is employed therein.

The plasma treating apparatus in which the seal material of the present invention is used is capable of etching a semiconductor with high precision and is further capable of ashing a resist superimposed on the semiconductor by the utilization of plasma being chemically highly active.

Illustratively, the above plasma treatment conducted during the semiconductor production is often carried out in vacuum for effectively generating desired plasma. Therefore, it is required that the seal material of the plasma treating apparatus have not only a durability to plasma but also a property such that the removal of gases from the seal material per se is suppressed in order to maintain the vacuum in chambers, etc. and to avoid staining of wafer and other products. The seal material of the present invention satisfies these requirements and is hence suitable for use in the plasma treating apparatus. The seal material is strikingly excellent in not only the above low friction and nonadherence but also plasma resistance, especially, resistance to chemically highly active plasma exposure.

The seal material of the present invention for food industry or the like is used for sealing parts where contamination should be avoided, such as a joint seal of drinking water piping, and is especially suitably used in a use environment in which sticking is likely to occur by, for example, the rise of the temperature.

The process for producing a surface modified rubber according to the present invention enables obtaining a rubber which, while retaining the properties such as rubber elasticity, mechanical strength, elasticity, compression set, deformation follow-up and sealing capability inherently possessed by the rubber material, is excellent in low friction, nonadherence, abrasion resistance and plasma resistance.

Because produced by the above process, the surface modified rubber and seal material comprising the surface modified rubber according to the present invention are excellent in low friction, nonadherence, abrasion resistance and plasma resistance and can perform the functions attributed to the structure of employed monomer, such as ozone and oil swell resistances. Thus, the seal material can suitably be used in a plasma treating apparatus and liquid crystal/semiconductor producing apparatuses and also in food industry.

In the present invention, the infiltration and diffusion into rubber base material (rubber network) of even monomers of different compatibility which are regarded as being hard to use in the above surface polymerization curing method, especially, in Japanese Patent Laid-open Publication No. 4(1992)-202239 can easily be accomplished as long as they are soluble in employed solvents, so that the applicable monomers are not particularly limited. Further, the degree of surface modification of the rubber base material (depth of modification from the surface of the rubber base material toward the internal part thereof) can easily be controlled in the present invention. For example, the monomer concentration can be regulated thin, so that controlling the degree of modification is easy. Moreover, in the present invention, monomers with high molecular weight, for example, macromers whose molecular weight ranges from about hundreds to tens of thousands can be infiltrated and diffused in the rubber base material, irrespective of the compatibility between the rubber base material and the monomer.

For example, even if the monomer is a fluoromonomer or silicon monomer whose compatibility with the rubber base material is generally poor, the use of the treatment liquid containing the monomer and a solvent enables easily infiltrating and diffusing the monomer together with the solvent in the rubber base material. The monomer infiltrated in the rubber base material is polymerized by the thermal decomposition of polymerization initiator infiltrated together with the monomer at the surface of rubber base material or vicinity thereof (surface layer), so that a solid immobilization of the monomer can be accomplished. In the above treatment, use can be made of one type or at least two types of fluoromonomers, or one type or at least two types of silicon monomers, or a mixture of fluoromonomer and silicon monomer.

In particular, when the polymerization initiator is a radical polymerization catalyst, the thermal decomposition of the radical polymerization catalyst induces a radical reaction with the result that the reaction and immobilization can be effected with greater solidity at the surface of rubber base material or vicinity thereof (surface layer).

EXAMPLES

The process for producing a surface modified rubber and, further, seal material according to the present invention will be described in detail below with reference to the following Examples, which in no way limit the scope of the invention.

Examples A1 to A7 and B1 to B5 and Comparative Examples A1 to A2 and B1 to B5

Solution (treatment liquid) of each of the compositions listed in Tables 11 to 14 was prepared. Rubber molding was immersed in the solution for a predetermined period of time and heated in a stream of carbon dioxide gas or a vacuum electric furnace.

Component compositions are indicated on the part of weight basis.

Rubber base material to which the treatment of Tables 11 and 12 was applied (Examples A1 to A7 and Comparative Examples A1 to A2) was composed of hydrogenated nitrile rubber (HNBR) base compound 70-degree item. Rubber base material to which the treatment of Tables 13 and 14 was applied (Examples B1 to B5 and Comparative Examples B1 to B5) was composed of fluoroelastomer (FKM) base compound 65-degree item.

The duration of immersion of rubber molding in each solution and heating conditions are given in Tables 7 to 10.

The vulcanizate properties such as tensile strength, elongation and hardness, adherence, friction coefficient and abrasion rate were measured of each of the resultant rubber moldings.

The measuring results are also given in Tables 11 to 14.

Raw materials, test methods and test conditions indicated in the tables will be described below.

(1) Vulcanizate properties: measured in accordance with apanese Industrial Standard K6301.

(2) Adherence test:

The adhesive strength was measured by the use of tacking tester Tack II manufactured by Rhesca Co., Ltd. under the following conditions.

Measuring conditions: opposite material SUS ϕ5, load 0.5 $Kgf/cm^2$ (0.049 MPa), parting speed 600 mm/min, temperature 25° C. or 150° C., and clamp time 1 min and 10 min.

(3) Matsubara friction/abrasion test:

The friction coefficient of a specimen to be measured (vulcanized rubber molding) was measured by the use of a thrust friction tester in the manner conceptually shown in FIG. 1. Illustratively, ring shaped metal SS41 designated 3 was set on the top of each specimen to be measured (vulcanized rubber molding) 1. The metal ring 3 was rotated on the vulcanized rubber molding 1 at a rate of 0.1 m/sec in such a state that a load of 2 $Kgf/cm^2$ was applied in a direction from under the vulcanized rubber molding 1 toward the upper metal ring 3. The friction coefficient and abrasion rate of the specimen were measured.

The conditions under which the friction coefficient as measured, the method of calculating the friction coefficient and the method of calculating the abrasion rate will be described below.

Conditions Under Which the Friction Coefficient was Measured

Instrument: thrust friction/abrasion tester TT100C manufactured by Mitsui Engineering and Shipbuilding Co., Ltd.; material of metal ring: SS41, $R_{max}$ about 2 μm; surface pressure: 0.196 MPa (provided that the pressure was 0.098 MPa in the use of FKM base specimen); speed: 0.1 m/s (provided that the speed was 0.05 m/s in the use of FKM base specimen); and sliding distance: 5 km (time: 13.889 hr) (provided that the distance was 720 m in the use of FKM base specimen (time: 2 hr)).

Method of Calculating the Friction Coefficient

The value of friction coefficient per time changes with the passage of sliding time, so that a friction coefficient was determined as an average.

Method of Calculating the Abrasion Rate

The abrasion rate was calculated from a difference between the weight of specimen prior to the above friction coefficient measurement and that after the friction coefficient measurement.

(4) Ball indenter friction test:

The friction coefficient of a specimen to be measured (vulcanized rubber molding) was measured by the use of Heidon surface tester, model HEIDON-14D (manufactured by Shinto Scientific Co., Ltd.) in acordance with the ball indenter (SUS ϕ6) method.

Figure 2:
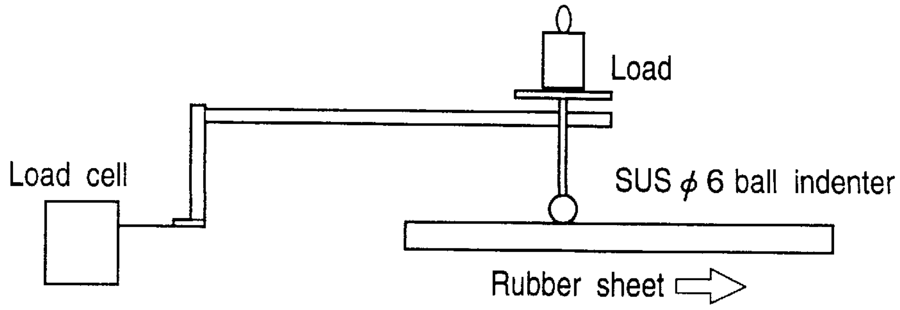
FIG. 2 is a side view illustrating the principle of Heidon surface tester used for measuring the friction coefficient in the Examples of the present invention.

The principle of this test is illustrated in FIG. 2.

Referring to FIG. 2, in this Heidon surface tester, a vertical load weight was mounted on a SUS ball through the medium of a support member. This SUS ball was pressed on a rubber sheet by the heaviness of the vertical load weight (200 g). The rubber sheet was moved in the direction right on the sheet of the drawing, and the produced friction force was measured. Other measuring conditions with the use of the above tester were as follows: measuring jig: ball indenter (SUS ϕ6); specimen size: rubber sheet of at least 100×150×2 (thickness) mm (up to 240×110×8 (thickness) mm); test load: 200 g (vertical load weight); test speed: 0.0005 m/s, 0.005 m/s; and atmosphere: 230° C.±2, 50%±10RH (within air conditioning range, no dewing).

Raw Materials Indicated in the Tables 1. acetone: guaranteed reagent;

2. fluoromonomer: perfluoroalkyl acrylate [2-(N-ethylperfluorooctasulfoamido)ethyl acrylate];

3. modified silicone monomer:

(3a type)

both terminal methacrylic modified silicone oil, viscosity 58 cs (25° C.), specific gravity 0.98, refractive index 1.410, functional group equivalent 1630 g/mol;

(3b type)

both terminal methacrylic modified silicone oil, viscosity 94 cs (25° C.), specific gravity 0.98, refractive index 1.408, functional group equivalent 2370 g/mol; and (3c type)

one terminal methacrylic modified silicone oil, viscosity 5 cs (25° C.), specific gravity 0.93, refractive index 1.418, functional group equivalent 420 g/mol;

4. methyl hydrogen silicone oil: viscosity 30 cSt (25° C.), specific gravity 1.00, refractive index 1.396; and 5. dicumyl peroxide: purity 97%, molecular weight 290.

TABLE 11

| | Ex. A1 | Ex. A2 | Ex. A3 | Ex. A4 |
|---|---|---|---|---|
| 1. Acetone | 100 | 100 | 100 | 100 |
| 2. Fluoromonomer | — | — | — | — |
| 3. Modified silicone monomer | | | | |
| 3a type | 7.0 | 7.0 | 7.0 | 10.0 |
| 3b type | — | — | — | — |
| 3c type | 3.0 | 3.0 | 3.0 | 3.0 |
| 4. Methylhydrogen type Silicone oil | — | 5.0 | 5.0 | — |
| 5. Radical polymerization initiator (DCP) | 1.5 | 1.5 | 1.5 | 1.5 |
| Immersion time (min.) | 2 | 2 | 4 | 2 |
| Heating conditions | | | | |
| Set temperature (° C. × hr) | 170 × 3 | 170 × 3 | 170 × 3 | 170 × 3 |
| Introduction of inert gas | ○ | ○ | ○ | ○ |
| Vacuum electric furnace | | | | |
| Friction characteristics Matsubara friction/abrasion tester Opp. material; SS41 P = 0.196 MPa, v = 0.1 m/sec. Friction coefficient (μ) | 1.13 | 1.00 | 0.75 | 0.76 |
| Abrasion amount (mg) Heidon surface tester Ball indenter method opp. material; SUSø6 Load; 200 g | 1.2 | 0.8 | 0.5 | 0.8 |
| Dynamic friction coefficient (μ) | | | | |
| at the time of v = 0.0005 m/sec. | 0.11 | 0.26 | 0.15 | 0.13 |
| at the time of v = 0.005 m/sec. | 0.20 | 0.43 | 0.32 | 0.24 |
| Tensile characteristics | | | | |
| TB (MPa) | 27.7 | 30.1 | 30.5 | 31.1 |
| EB (%) | 244 | 255 | 249 | 264 |
| 100 Mo (MPa) | 6.4 | 6.8 | 7.3 | 6.7 |
| JIS A Hs (point) | 72 | 74 | 75 | 74 |
| Adhesion strength 25° C., clamp 1 min. (gf) | 38.2 | 33.1 | 27.1 | 25.5 |

TABLE 12

| | Example | | | Comparative Ex. | |
|---|---|---|---|---|---|
| | Ex. A5 | Ex. A6 | Ex. A7 | Co. Ex. A1 | Co. Ex. A2 |
| 1. Acetone | 100 | 100 | 100 | — | 100 |
| 2. Fluoromonomer | 20 | 20 | — | — | — |
| 3. Modified silicone monomer | | | | | |
| 3a type | — | 7.0 | 7.0 | — | — |
| 3b type | — | — | — | — | — |
| 3c type | — | 3.0 | 3.0 | — | — |
| 4. Methylhydrogen type Silicone oil | — | — | — | — | — |
| 5. Radical polymerization initiator (DCP) | 1.5 | 1.5 | 1.5 | — | 1.5 |
| Immersion time (min.) | 2 | 2 | 2 | — | 2 |
| Heating conditions | | | | | |
| Set temperature (° C. × hr) | 170 × 3 | 170 × 3 | 170 × 3 | — — | 170 × 3 |
| Introduction of inert gas | ○ | ○ | | | ○ |
| Vacuum electric furnace | | | ○ | | |
| Friction characteristics Matsubara friction/abrasion tester Opp. material; SS41 P = 0.196 MPa, v = 0.1 m/sec. Friction coefficient (μ) | 0.95 | 0.90 | 0.85 | 2.93 | 3.25 |
| Abrasion amount (mg) Heidon surface tester Ball indenter method opp. material; SUSø6 Load; 200 g | 13.8 | 9.2 | 0.9 | 25 | 25.1 |
| Dynamic friction coefficient (μ) | | | | | |
| at the time of v = 0.0005 m/sec. | 1.95 | 0.05 | 0.05 | 1.30 | 1.73 |
| at the time of v = 0.005 m/sec. | 1.97 | 0.10 | 0.06 | 1.41 | 1.94 |
| Tensile characteristics | | | | | |
| TB (MPa) | 28.3 | 27.9 | 31.0 | 29.4 | 30.3 |
| EB (%) | 249 | 250 | 270 | 250 | 250 |
| 100 Mo (MPa) | 6.9 | 6.5 | 6.5 | 6.7 | 7.1 |
| JIS A Hs (point) | 74 | 72 | 72 | 75 | 74 |
| Adhesive strength 25° C., clamp 1 min. (gf) | 59.3 | 32.0 | 25.0 | 83.3 | 75.5 |

TABLE 13

| | Example | | | | |
|---|---|---|---|---|---|
| | Ex. B1 | Ex. B2 | Ex. B3 | Ex. B4 | Ex. B5 |
| 1. Solvent Acetone | 100 | 100 | 100 | 100 | 100 |
| 2. Fluoromonomer | — | 10 | — | — | — |
| 3. Modified silicone monomer | | | | | |
| 3a type | 7 | 7 | 7 | 7 | 7 |
| 3c type | 3 | 3 | 3 | 3 | 3 |
| 4. Methylhydrogen type Silicone oil | 5 | — | — | — | 5 |
| 5. Radical polymerization initiator (DCP) | 1 | 1 | 1 | 1 | 1 |
| Immersion time (min.) | 5 | 5 | 5 | 5 | 5 |
| Heating conditions | | | | | |
| Set temperature (° C. × hr) | 170 × 180 | 170 × 180 | 170 × 180 | 170 × 180 | 170 × 180 |
| Introduction of inert gas | ○ | ○ | ○ | | |
| Vacuum electric furnace | | | | ○ | ○ |

TABLE 13-continued

| | Example | | | | |
|---|---|---|---|---|---|
| | Ex. B1 | Ex. B2 | Ex. B3 | Ex. B4 | Ex. B5 |
| Matsubara friction/abrasion tester | | | | | |
| Friction coefficient (μ) Surface pressure 1 kgf/$cm^2$ Rotational frequency 104.2 r.p.m. 2 hr measurement | 0.8 | 0.6 | 1.6 | 1.32 | 1.4 |
| Abrasion amount (mg) | 6.3 | 6.5 | 4.8 | 6.4 | 3.2 |
| Ball indenter method friction test (μ) | | | | | |
| Speed 30 mm/min. static friction coefficient | 0.16 | 0.10 | 0.30 | 0.23 | 0.13 |
| dynamic friction coefficient | 0.11 | 0.18 | 0.31 | 0.17 | 0.16 |
| Speed 300 mm/min. static friction coefficient | 0.38 | 0.27 | 0.52 | 0.54 | 0.29 |
| dynamic friction coefficient | 0.28 | 0.29 | 0.47 | 0.32 | 0.22 |
| Adherence test (gf) | | | | | |
| 25° C., clamp 10 min (gf) | 136.4 | 206.1 | 215.0 | 137.5 | 68.9 |
| 150° C., clamp 10 min (gf) | 11.7 | 11.7 | 12.2 | 5.0 | 6.5 |
| Ordinary properties | | | | | |
| JIS A (point) | 64 | 65 | 65 | 65 | 66 |
| Tensile strength (Mpa) | 16.9 | 17.9 | 17.8 | 18.9 | 18.1 |
| Elongation (%) | 540 | 565 | 650 | 518 | 535 |
| 100% tensile stress (Mpa) | 1.8 | 1.9 | 1.8 | 1.7 | 1.6 |

TABLE 14

| | Comparative Example | | | | |
|---|---|---|---|---|---|
| | Com. Ex. B1 | Com. Ex. B2 | Com. Ex. B3 | Com. Ex. B4 | Com. Ex. B5 |
| 1. Solvent Acetone | — | 100 | 100 | — | 100 |
| 2. Fluoromonomer | — | — | — | — | 10 |
| 3. Modified silicone monomer | | | | | |
| 3a type 3c type | — | — | — | 10 | — |
| 4. Methylhydrogen type Silicone oil | — | — | 5 | — | — |
| 5. Radical polymerization initiator (DCP) | — | — | 1 | 1 | 1 |
| Immersion time (min.) | — | 5 | 5 | 5 | 5 |
| Heating conditions | | | | | |
| Set temperature (° C. × hr) | 170 × 180 | 170 × 180 | 170 × 180 | 170 × 180 | 170 × 180 |
| Introduction of inert gas Vacuum electric furnace | — | — | ○ | ○ | ○ |
| Matsubara friction tester | | | | | |
| Friction coefficient (μ) Surface pressure 1 kgf/$cm^2$ Rotational freq. 104.2 r.p.m. 2 h measurement | 1.40 | 1.45 | 1.90 | 1.88 | 1.75 |
| Abrasion amount (mg) | 12.4 | 13.5 | 11.5 | 24.1 | 7.2 |
| Ball indenter method friction test (μ) | | | | | |
| Speed 30 mm/min. static friction coefficient | 1.58 | 1.81 | 2.04 | 1.76 | 1.28 |

TABLE 14-continued

| | Comparative Example | | | | |
|---|---|---|---|---|---|
| | Com. Ex. B1 | Com. Ex. B2 | Com. Ex. B3 | Com. Ex. B4 | Com. Ex. B5 |
| dynamic friction coefficient | 0.92 | 1.57 | 0.91 | 0.31 | 0.39 |
| Speed 300 mm/min. static friction coefficient | 1.63 | 2.42 | 2.63 | 2.11 | 1.67 |
| dynamic friction coefficient | 1.03 | 1.56 | 1.27 | 0.56 | 0.57 |
| Adherence test (gf) | | | | | |
| 25° C., clamp 10 min (gf) | 327.7 | 270.2 | 173.1 | 263.1 | 456.3 |
| 150° C., clamp 10 min (gf) | 39.8 | 45.9 | 69.6 | 98.8 | 26.6 |
| Ordinary properties | | | | | |
| JIS A (point) | 66 | 65 | 67 | 68 | 66 |
| Tensile strength (Mpa) | 14.7 | 16.2 | 12.3 | 12.8 | 19.6 |
| Elongation (%) | 575 | 590 | 545 | 507 | 600 |
| 100% tensile stress (Mpa) | 1.9 | 1.9 | 1.5 | 1.6 | 1.8 |

(Remark) Comparative Example B4 → Coating of raw solution of monomer

Examples C1 to C2 and Comparative Examples C1 to C3

Solution (treatment liquid) of each of the compositions listed in Table 15 was prepared. Rubber molding (fluoroelastomer molding) was immersed in the solution for a predetermined period of time and heated in a vacuum electric furnace.

Rubber base material to which the treatment of Table 15 was applied (Examples C1 to C2 and Comparative Examples C1 to C3) was composed of fluoroelastomer (FKM) base compound 65-degree item having the following properties.

In Comparative Example C2, use was made of a rubber base material immersed in acetone and dried prior to the immersion in the treatment liquid.

The rubber base material comprises:

elastomeric polymer chain segment (i) consisting of vinylidene fluoride units (A), hexafluoropropylene units (B) and tetrafluoroethylene units (C) whose molar proportion ((A)/(B)/(C)) is 40 to 90/5 to 50/0 to 35 (100 mol in total) and having a molecular weight of 30 thousand to 1200 thousand; and nonelastomeric polymer chain segment (ii) consisting of ethylene units (X), tetrafluoroethylene units (Y) and hexafluoropropylene units (Z) whose molar proportion ((X)/(Y)/(Z)) is 40 to 60/60 to 40/0 to 30 (100 mol in total) and having a molecular weight of 30 thousand to 400 thousand;

wherein the weight ratio of both segments ((i)/(ii)) is 40 to 95/60 to 5 (100 parts by weight in total) (trade name: Dai-el Thermoplastic T530, produced by Daikin Industries, Ltd.).

The time of immersion of rubber molding in each solution and heating conditions are given in Table 15.

The vulcanizate properties such as tensile strength, elongation, hardness and chemical resistance, sticking level, oxygen plasma resistance and purity (low outgassing property) were measured of each of the resultant rubber moldings. The measuring results are also given in Table 15.

Raw materials, test methods and test conditions indicated in the table will be described below.

(1) Vulcanizate Properties:

measured in accordance with Japanese Industrial Standard K6301.

Figure 3:
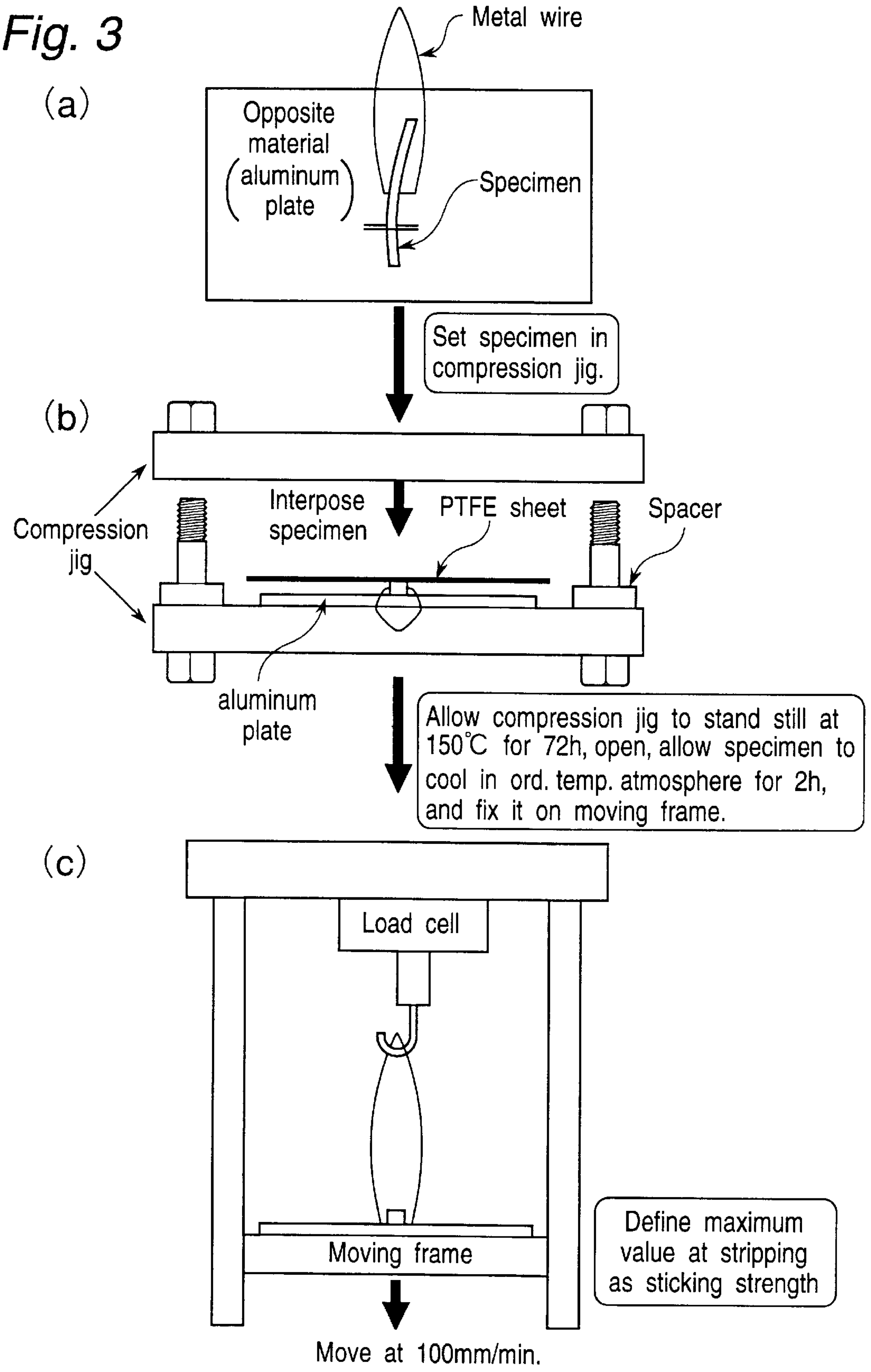
FIG. 3 is a flow chart showing a sticking strength measuring instrument used in the present application.

(2) Sticking strength:

Referring to FIG. 3(*a*), a metal wire was disposed on an opposite material (aluminum plate). Each specimen (rubber molding) was placed thereon astride part of the metal wire. Now, referring to FIG. 3(*b*), the specimen together with the metal wire was compressed with the use of a compression jig under the following conditions. The compression was released, and the specimen was allowed to cool for 2 hr. Thereafter, referring to FIG. 3(*c*), the metal wire was hung on a load gauge, and the opposite material aluminum plate was moved downward. At that time the maximum strength required for stripping the specimen from the opposite material was measured, which was defined as the sticking strength.

The sticking strength was evaluated in five levels, levels 1 to 5, wherein the smaller the number, the smaller the sticking strength.

The conditions for measuring sticking strength were as follows:

opposite material: aluminum (A5052) $\phi 3.5 \times 50$ mm, compression time: 72 hr, compression temperature: 150° C., and pulling speed: 100 mm/min.

(3) Plasma Resistance:

The plasma resistance was evaluated by irradiating the specimen with oxygen plasma under the following conditions by the use of PLASMA DEPOSITION MODEL PD-2 manufactured by SAMCO and measuring the ratio of weight loss of specimen caused by the plasma irradiation.

The plasma resistance was evaluated in five levels, levels 1 to 5, wherein the smaller the number, the lower the plasma resistance.

The measuring conditions were as follows:

specimen: 10 mm×10 mm×2 mm (thickness), irradiation time: 120 min, introduced gas: $O_2$, flow rate: 10 ml/min, degree of vacuum: 0.75 Torr, and RF output: 67 W.

(4) Purity (outgassing property):

The purity (outgassing property) was evaluated by measuring the amount of gas emitted from the specimen and analyzing the mass spectrum of emitted gas.

The specimen was placed in a vacuum of the order of $10^{-8}$ Torr in a chamber at ordinary temperature (25±3° C.) for 50 hr, and the change of partial pressure in the chamber was measured by the use of an ionization vacuum gauge, thereby determining the amount of emitted gas. The evaluation was made in five levels, levels 1 to 5, wherein the smaller the number, the smaller the amount of emitted gas.

The evaluation criteria are as follows:

1: the amount of gas emitted within the 50 hr was on the order of $1\times10^{-5}$, 2 to 4: intermediate amounts, and 5: the amount of gas emitted within the 50 hr was on the order of $1\times10^{-3}$.

The amount of gas emitted from the specimen was calculated by deducting the amount of gas emitted from the chamber from the above amount of emitted gas. Mass spectrum of the gas emitted from the specimen was taken by the use of a quadrupolar mass spectrometer under the following conditions.

The mass spectrometry conditions were as follows:

mass number: 1 to 200, ionic current: $1\times10^{5}$ to $1\times10^{10}$ A, scanning speed: 0.5 s/amu, and applied voltage: 2.0 kV.

TABLE 15

| | Example | | Comparative Example | | |
|---|---|---|---|---|---|
| | C1 | C2 | C1 | C2 | C3 |
| Treatment liquid | | | | | |
| 1. Acetone | 100 | 100 | — | 100 | 100 |
| 2. Modified silicone monomer | | | | | |
| 3a type | 10 | 12 | — | — | — |
| 3c type | 5 | 6 | — | — | — |
| 3. Methylhydrogen type Silicone oil | 3 | — | — | — | 3 |
| 4. Radical polymerization initiator | 1 | 1 | — | — | 1 |
| Immersion time of rubber base material in treatment liquid (min) | 5 | 5 | — | 5 | 5 |
| Heating conditions in vacuum electric furnace Set temperature (° C.) × treatment time (hr) | 170° C. × 16 hr | 170° C. × 16 hr | — | — | 170° C. × 16 hr |
| Vulcanizate properties | | | | | |
| Tensile properties | | | | | |
| TB (MPa) | 16.6 | 18.9 | 19.5 | 16.2 | 12.3 |
| EB (%) | 580 | 518 | 530 | 590 | 545 |
| 100 Mo (MPa) | 1.7 | 1.7 | 1.8 | 1.9 | 1.5 |
| JIS A Hs (point) | 66 | 65 | 67 | 65 | 67 |
| Chemical resistance (vol. increase %) | | | | | |
| 35% hydrochloric acid 100° C. × 7 days | less than 5% | less than 5% | less than 5% | less than 5% | less than 5% |
| 70% nitric acid 100° C. × 7 days | less than 5% | less than 5% | less than 5% | less than 5% | less than 5% |
| 98% sulfuric acid 100° C. × 7 days | less than 5% | less than 5% | less than 5% | less than 5% | less than 5% |
| 85% phosphoric acid 100° C. × 7 days | less than 5% | less than 5% | less than 5% | less than 5% | less than 5% |
| 50% hydrofluoric acid 40° C. × 7 days | less than 5% | less than 5% | less than 5% | less than 5% | less than 5% |
| 30% aq. hydrogen peroxide 40° C. × 7 days | less than 5% | less than 5% | less than 5% | less than 5% | less than 5% |
| Sticking strength: evaluated in 5 levels (kgf) | 1 (0.20) | 2 (0.25) | 5 (1.75) | 5 (1.65) | 4 (1.45) |
| Oxygen plasma resistance weight loss ratio: evaluated in 5 levels (%) | 1 (0.12) | 1 (0.20) | 5 (1.30) | 5 (1.20) | 5 (1.05) |
| Purity | | | | | |
| Amount of emitted gas | 1 | 1 | 1 | 1 | 1 |
| Mass spectrum of emitted gas Component with MW of at least 50 | None | None | Detected | Detected | None |

As apparent from the foregoing description, the process for producing a surface modified rubber according to the present invention is useful for obtaining a rubber which, while retaining the properties such as compression set, rubber elasticity, mechanical strength and deformation follow-up inherently possessed by the rubber material, is excellent in low friction, nonadherence, abrasion resistance and plasma resistance. Thus, the surface modified rubber obtained by the process of the present invention can widely be utilized as seal materials in, for example, chemical equipment, liquid crystal/semiconductor producing apparatuses, piping/tanks for chemicals and food producing apparatuses.

What is claimed is:

1. A process for producing a surface modified rubber, comprising:

contacting a treatment liquid containing a monomer having a polymerizable double bond, a polymerization initiator and a solvent with a rubber base material, wherein the monomer is a monomer of an ethylenically unsaturated fluorocompound or an ethylenically unsaturated organosiloxane or both and said solvent dissolves the monomer and the polymerization initiator and swells the rubber base material such that the solvent, the monomer and the polymerization initiator infiltrate the rubber base material; and heating the thus contact treated rubber base material at a temperature to activate the polymerization initiator so that the monomer is polymerized to thereby modify the rubber base material at its surface and vicinity thereof and wherein the contact treated rubber base material is heated in the presence of not more than $1.0\times10^{19}$ oxygen molecules per $cm^3$.

2. The process as claimed in claim 1, wherein the polymerization initiator is a radical polymerization initiator.

3. The process as claimed in claim 1, wherein the contact treated rubber base material is heated in the presence of not more than $5.6\times10^{18}$ oxygen molecules per $cm^3$.

4. The process claimed in claim 1, wherein the polymerizable double bond having monomer is an ethylenically unsaturated fluorocompound or an ethylenically unsaturated organosiloxane or both.

5. The process as claimed in claim 4, wherein the polymerizable double bond having monomer is an ethylenically unsaturated organosiloxane.

6. The process as claimed in claim 1, wherein the rubber base material is a fluoroelastomer.

7. The process as claimed in claim 1, wherein polymerization is performed in a vacuum or an inert gas.

8. The process as claimed in claim 1, wherein the treatment liquid further contains methyl hydrogen silicone oil.

9. The process as claimed in claim 1, wherein the contact of the treatment liquid with the rubber base material is conducted by immersing the rubber base material in the treatment liquid.

10. A surface modified rubber produced by the process as claimed in claim 1.

11. A seal material comprising the surface modified rubber as claimed in claim 10.

12. A liquid crystal/semiconductor producing apparatus comprising the seal material as claimed in claim 11.

13. A plasma treating apparatus comprising the seal material as claimed in claim 11.

* * * * *

UNITED STATES PATENT AND TRADEMARK OFFICE

CERTIFICATE OF CORRECTION

PATENT NO. : 6,074,698

DATED : June 13, 2000

INVENTOR(S) : Shinya SAKURAI et al.

It is certified that error appears in the above-identified patent and that said Letters Patent is hereby corrected as shown below:

Column 2 Line 67 "vulcanizatio" should read --vulcanization--.

Column 6 Line 11 after "in" insert --the--.

Column 6 Line 11 after "Comparative" delete --the--.

Column 6 Line 60 "amacromonomer" should read --macromonomer--.

Column 7 Lines 25-26 "(ethylene-ropylene-diore" should read --(ethylene-propylene-diene--.

Column 8 Line 5 "ther" should read --other--.

Column 9 Line 23 "$(CH_3)$" should read --$(CF_3)$--.

Column 14 Line 65 "Suitable" should read --suitable--.

Column 15 Lines 25-26 "olymerization" should read --polymerization--.

Column 15 Line 26 "olymerization" should read --polymerization--.

Column 15 Line 27 "anging" should read --ranging--.

Column 17 Line 7 "luoride" should read --fluoride--.

Column 17 Line 8 "opolymer" should read --copolymer--.

Column 20 Line 36 after the second occurrence of "the" delete --.--.

Column 21 Line 43 "lasma" should read --plasma--.

Column 21 Line 44 "puttering" should read --sputtering--.

Column 22 Line 1 "et" should read --wet--.

UNITED STATES PATENT AND TRADEMARK OFFICE

CERTIFICATE OF CORRECTION

PATENT NO. :6,074,698

DATED :June 13, 2000

INVENTOR(S) :Shinya SAKURAI et al.

It is certified that error appears in the above-identified patent and that said Letters Patent is hereby corrected as shown below:

Column 22 Line 3 "nspection" should read --inspection--.

Column 24 Line 5 "apanese" should read --Japanese--.

Signed and Sealed this

Twenty-second Day of May, 2001

Attest:

NICHOLAS P. GODICI

Attesting Officer

*Acting Director of the United States Patent and Trademark Office*